(12) United States Patent
Azernikov et al.

(10) Patent No.: US 12,210,802 B2
(45) Date of Patent: Jan. 28, 2025

(54) NEURAL NETWORK MARGIN PROPOSAL

(71) Applicant: James R. Glidewell Dental Ceramics, Inc., Newport Beach, CA (US)

(72) Inventors: Sergei Azernikov, Irvine, CA (US); Simon Karpenko, Newport Beach, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 854 days.

(21) Appl. No.: 17/245,944

(22) Filed: Apr. 30, 2021

(65) Prior Publication Data

US 2022/0350936 A1   Nov. 3, 2022

(51) Int. Cl.
| | |
|---|---|
| *G06F 30/10* | (2020.01) |
| *G06F 30/23* | (2020.01) |
| *G06F 30/27* | (2020.01) |
| *G06N 3/045* | (2023.01) |
| *G06N 3/08* | (2023.01) |
| *G06T 17/20* | (2006.01) |

(52) U.S. Cl.
CPC .............. *G06F 30/10* (2020.01); *G06F 30/23* (2020.01); *G06F 30/27* (2020.01); *G06N 3/045* (2023.01); *G06N 3/08* (2013.01); *G06T 17/20* (2013.01); *G06T 2210/41* (2013.01)

(58) Field of Classification Search
CPC .......... G06F 30/10; G06F 30/23; G06F 30/27; G06F 30/12; G06N 3/045; G06N 3/08; G06N 3/0475; G06N 3/0464; G06N 3/09; G06N 3/048; G06N 3/088; G06N 3/094; G06T 17/20; G06T 2210/41; G06T 17/00; A61C 13/0004

USPC ......................................................... 382/128
See application file for complete search history.

(56) References Cited

U.S. PATENT DOCUMENTS

| | | |
|---|---|---|
| 6,140,950 A | 10/2000 | Oprescu |
| 6,409,504 B1 | 6/2002 | Jones et al. |
| 6,701,016 B1 | 3/2004 | Jojic et al. |
| 7,084,868 B2 | 8/2006 | Farag et al. |
| 7,187,790 B2 | 3/2007 | Sabol et al. |
| 7,490,085 B2 | 2/2009 | Walker et al. |
| 7,702,492 B2 | 4/2010 | Marshall |
| 7,708,557 B2 | 5/2010 | Rubbert |

(Continued)

FOREIGN PATENT DOCUMENTS

| | | |
|---|---|---|
| CA | 3146240 A1 | 1/2021 |
| DE | 102017203475 A1 | 9/2018 |

(Continued)

OTHER PUBLICATIONS

US 11,182,981 B2, 11/2021, Long et al. (withdrawn)

(Continued)

*Primary Examiner* — Charlotte M Baker
(74) *Attorney, Agent, or Firm* — Klarquist Sparkman, LLP

(57) ABSTRACT

A computer-implemented method/system/instructions of automatic margin line proposal includes receiving a 3D digital model of at least a portion of a jaw, the 3D digital model including a digital preparation tooth; determining, using a first trained neural network, an inner representation of the 3D digital model; and determining, using a second trained neural network, a margin line proposal from a base margin line and the inner representation of the 3D digital model.

17 Claims, 16 Drawing Sheets

(56) References Cited

U.S. PATENT DOCUMENTS

| | | |
|---|---|---|
| 7,860,300 B2 | 12/2010 | Siltanen et al. |
| 8,068,580 B2 | 11/2011 | Lang et al. |
| 8,126,726 B2 | 2/2012 | Matov et al. |
| 8,454,362 B2 | 6/2013 | Rubbert |
| 8,602,780 B2 | 12/2013 | Rubbert |
| 9,417,700 B2 | 8/2016 | El Dokor et al. |
| 9,474,582 B2 | 10/2016 | Musuvathy et al. |
| 9,818,186 B2 | 11/2017 | Kim et al. |
| 9,865,176 B2 | 1/2018 | Tran |
| 10,278,584 B2 | 5/2019 | Glinec et al. |
| 10,438,363 B2 | 10/2019 | Kim et al. |
| 10,537,463 B2 | 1/2020 | Kopelman |
| 10,542,944 B2 | 1/2020 | Petersilka |
| 10,548,690 B2 | 2/2020 | Wen |
| 10,624,717 B2 | 4/2020 | Wen |
| 10,755,409 B2 | 8/2020 | Salah et al. |
| 10,912,530 B2 | 2/2021 | Mandelkern et al. |
| 10,925,691 B2 | 2/2021 | Yancey et al. |
| 10,932,890 B1 | 3/2021 | Sant et al. |
| 10,984,529 B2 | 4/2021 | Carter et al. |
| 10,997,727 B2 | 5/2021 | Xue et al. |
| 11,000,349 B2 | 5/2021 | Willers et al. |
| 11,007,040 B2 | 5/2021 | Azernikov et al. |
| 11,026,766 B2 | 6/2021 | Chekh et al. |
| 11,049,248 B2 | 6/2021 | Salah et al. |
| 11,051,912 B2 | 7/2021 | Martz et al. |
| 11,051,914 B2 | 7/2021 | Kopelman et al. |
| 11,109,945 B2 | 8/2021 | Salah et al. |
| 11,116,466 B2 | 9/2021 | Mandelkern et al. |
| 11,154,267 B2 | 10/2021 | Mandelkern et al. |
| 11,164,045 B2 | 11/2021 | Paik et al. |
| 11,189,021 B2 | 11/2021 | Shah et al. |
| 11,191,508 B2 | 12/2021 | Mandelkern et al. |
| 11,191,618 B1 | 12/2021 | Raslambekov |
| 11,194,312 B2 | 12/2021 | Cramer et al. |
| 11,232,573 B2 | 1/2022 | Brown et al. |
| 11,238,586 B2 | 2/2022 | Minchenkov et al. |
| 11,250,580 B2 | 2/2022 | Meyer et al. |
| 11,270,523 B2 | 3/2022 | Long et al. |
| 11,278,375 B2 | 3/2022 | Wang et al. |
| 11,291,404 B2 | 4/2022 | Schnabel et al. |
| 11,291,532 B2 | 4/2022 | Azernikov et al. |
| 11,399,792 B2 | 8/2022 | Mandelkern et al. |
| 11,403,813 B2 | 8/2022 | Katzman et al. |
| 11,423,697 B1 | 8/2022 | Wucher et al. |
| 11,517,272 B2 | 12/2022 | Unklesbay et al. |
| 11,534,272 B2 | 12/2022 | Li et al. |
| 11,534,275 B2 | 12/2022 | Wey |
| 11,568,656 B2 | 1/2023 | Mohan et al. |
| 11,589,955 B2 | 2/2023 | Medvinskaya et al. |
| 11,589,957 B2 | 2/2023 | Carrier, Jr. et al. |
| 11,622,843 B2 | 4/2023 | Nikolskiy et al. |
| 11,672,629 B2 | 6/2023 | Chekh et al. |
| 11,676,701 B2 | 6/2023 | Carter et al. |
| 11,694,418 B2 | 7/2023 | Long et al. |
| 11,735,306 B2 | 8/2023 | Wirjadi et al. |
| 11,887,209 B2 | 1/2024 | Traff et al. |
| 11,894,114 B2 | 2/2024 | Paik et al. |
| 11,900,538 B2 | 2/2024 | Katzman et al. |
| 11,918,437 B2 | 3/2024 | Salah et al. |
| 2002/0015934 A1 | 2/2002 | Rubbert et al. |
| 2002/0028418 A1 | 3/2002 | Farag et al. |
| 2004/0122702 A1 | 6/2004 | Sabol et al. |
| 2004/0122703 A1 | 6/2004 | Walker et al. |
| 2004/0122719 A1 | 6/2004 | Sabol et al. |
| 2004/0152036 A1 | 8/2004 | Abolfathi |
| 2004/0197728 A1 | 10/2004 | Abolfathi et al. |
| 2005/0192835 A1 | 9/2005 | Kuo et al. |
| 2007/0047794 A1 | 3/2007 | Lang et al. |
| 2007/0183633 A1 | 8/2007 | Hoffmann |
| 2009/0019552 A1 | 1/2009 | McLaughlin et al. |
| 2009/0024416 A1 | 1/2009 | McLaughlin et al. |
| 2010/0309301 A1 | 12/2010 | Thiel et al. |
| 2013/0022252 A1 | 1/2013 | Chen et al. |
| 2013/0022255 A1 | 1/2013 | Chen et al. |
| 2013/0244208 A1 | 9/2013 | Rubbert |
| 2014/0003695 A1 | 1/2014 | Dean et al. |
| 2015/0056576 A1 | 2/2015 | Nikolskiy et al. |
| 2016/0199215 A1 | 7/2016 | Kopelman |
| 2017/0008168 A1 | 1/2017 | Weng et al. |
| 2017/0045950 A1 | 2/2017 | Doker et al. |
| 2017/0100213 A1 | 4/2017 | Kuo |
| 2017/0281110 A1 | 10/2017 | Mandelkern et al. |
| 2017/0340418 A1 | 11/2017 | Raanan |
| 2018/0008213 A1 | 1/2018 | Rubbert |
| 2018/0028294 A1 | 2/2018 | Azernikov et al. |
| 2018/0121601 A1 | 5/2018 | Hahm et al. |
| 2018/0132982 A1 | 5/2018 | Nikolskiy et al. |
| 2018/0144466 A1 | 5/2018 | Hsieh et al. |
| 2018/0303581 A1 | 10/2018 | Martz et al. |
| 2018/0360567 A1 | 12/2018 | Xue et al. |
| 2018/0365089 A1 | 12/2018 | Okanohara et al. |
| 2019/0083209 A1 | 3/2019 | Lior et al. |
| 2019/0150724 A1 | 5/2019 | Elazar et al. |
| 2019/0197358 A1 | 6/2019 | Madani et al. |
| 2019/0282344 A1 | 9/2019 | Azernikov et al. |
| 2019/0318479 A1 | 10/2019 | Ajri et al. |
| 2020/0000562 A1 | 1/2020 | Wey |
| 2020/0013145 A1 | 1/2020 | Ratner et al. |
| 2020/0022783 A1 | 1/2020 | Cramer et al. |
| 2020/0022790 A1 | 1/2020 | Fisker |
| 2020/0027252 A1 | 1/2020 | Ye et al. |
| 2020/0066391 A1 | 2/2020 | Sachdeva et al. |
| 2020/0125069 A1 | 4/2020 | Sirovskiy et al. |
| 2020/0175681 A1 | 6/2020 | Ezhov et al. |
| 2020/0268495 A1 | 8/2020 | Ryakhovsky et al. |
| 2020/0273248 A1 | 8/2020 | Jorgensen et al. |
| 2020/0293878 A1* | 9/2020 | Bhaskar ............ G06Q 30/0201 |
| 2020/0297458 A1 | 9/2020 | Roschin et al. |
| 2020/0311934 A1 | 10/2020 | Cherkas et al. |
| 2020/0383752 A1 | 12/2020 | Willers et al. |
| 2020/0402272 A1 | 12/2020 | Xu et al. |
| 2020/0405455 A1 | 12/2020 | Nikolskiy et al. |
| 2020/0405456 A1 | 12/2020 | Nikolskiy et al. |
| 2020/0405464 A1 | 12/2020 | Nikolskiy et al. |
| 2020/0411201 A1 | 12/2020 | Kearney et al. |
| 2021/0005017 A1 | 1/2021 | Hollenbeck |
| 2021/0012884 A1 | 1/2021 | Kim et al. |
| 2021/0034813 A1 | 2/2021 | Wu et al. |
| 2021/0059796 A1 | 3/2021 | Weiss et al. |
| 2021/0073998 A1 | 3/2021 | Brown et al. |
| 2021/0085238 A1 | 3/2021 | Schnabel et al. |
| 2021/0090272 A1 | 3/2021 | Meyer et al. |
| 2021/0093421 A1 | 4/2021 | Michaeli et al. |
| 2021/0100642 A1 | 4/2021 | Weiss et al. |
| 2021/0100643 A1 | 4/2021 | Weiss et al. |
| 2021/0106409 A1 | 4/2021 | Ojelund et al. |
| 2021/0110605 A1 | 4/2021 | Haslam et al. |
| 2021/0153986 A1 | 5/2021 | Wirjadi et al. |
| 2021/0158607 A1 | 5/2021 | Katzman et al. |
| 2021/0174604 A1 | 6/2021 | Long et al. |
| 2021/0196434 A1 | 7/2021 | Cramer et al. |
| 2021/0216822 A1 | 7/2021 | Paik et al. |
| 2021/0236249 A1 | 8/2021 | Nikolskiy et al. |
| 2021/0251729 A1 | 8/2021 | Schneider et al. |
| 2021/0255600 A1 | 8/2021 | Faust |
| 2021/0264611 A1 | 8/2021 | Xue et al. |
| 2021/0315667 A1 | 10/2021 | Raslambekov |
| 2021/0321872 A1 | 10/2021 | Saphier et al. |
| 2021/0338400 A1 | 11/2021 | Murata et al. |
| 2021/0353154 A1 | 11/2021 | Saphier et al. |
| 2021/0393375 A1 | 12/2021 | Chekh et al. |
| 2022/0000583 A1 | 1/2022 | Parpara et al. |
| 2022/0008175 A1 | 1/2022 | Ojelund et al. |
| 2022/0028162 A1 | 1/2022 | Katzman et al. |
| 2022/0130045 A1 | 4/2022 | Kopelman et al. |
| 2022/0137592 A1 | 5/2022 | Cramer et al. |
| 2022/0148173 A1 | 5/2022 | Minchenkov et al. |
| 2022/0165388 A1 | 5/2022 | Chernov et al. |
| 2022/0189130 A1 | 6/2022 | Long et al. |
| 2022/0215531 A1 | 7/2022 | Azernikov et al. |
| 2022/0215928 A1 | 7/2022 | Tabak et al. |
| 2022/0257342 A1 | 8/2022 | Kuo |
| 2022/0262007 A1 | 8/2022 | Cramer et al. |

(56) References Cited

U.S. PATENT DOCUMENTS

| | | | |
|---|---|---|---|
| 2022/0296344 A1 | 9/2022 | Lee et al. | |
| 2022/0304782 A1* | 9/2022 | Derzapf | G16H 40/63 |
| 2022/0318989 A1 | 10/2022 | Chelnokov et al. | |
| 2022/0327774 A1 | 10/2022 | Katzman et al. | |
| 2022/0350936 A1 | 11/2022 | Azernikov et al. | |
| 2022/0369916 A1 | 11/2022 | Carrier, Jr. et al. | |
| 2022/0378548 A1 | 12/2022 | Salah et al. | |
| 2023/0048895 A1 | 2/2023 | Wucher et al. | |
| 2023/0057664 A1 | 2/2023 | Steger | |
| 2023/0066220 A1* | 3/2023 | Coulombe | G06V 10/82 |
| 2023/0075514 A1 | 3/2023 | Wiedemann et al. | |
| 2023/0153476 A1* | 5/2023 | Fabbri | G06T 17/20 706/47 |
| 2023/0218370 A1 | 7/2023 | Azernikov et al. | |
| 2023/0410495 A1 | 12/2023 | Xue et al. | |
| 2024/0028782 A1 | 1/2024 | Selberis et al. | |
| 2024/0029380 A1 | 1/2024 | Azernikov et al. | |

FOREIGN PATENT DOCUMENTS

| | | |
|---|---|---|
| EP | 1368986 B1 | 12/2011 |
| EP | 3671531 A1 | 12/2018 |
| EP | 3767521 A1 | 7/2019 |
| EP | 3797732 A1 | 9/2019 |
| KR | 101718868 B1 | 3/2017 |
| KR | 102334519 B1 | 12/2021 |
| WO | 2012061652 A2 | 5/2012 |
| WO | 2016044465 A1 | 3/2016 |
| WO | 2018069736 A1 | 4/2018 |
| WO | 2018118200 A1 | 6/2018 |
| WO | 2018158411 A1 | 9/2018 |
| WO | 2018195554 A1 | 10/2018 |
| WO | 2019217764 A1 | 4/2019 |
| WO | 2019100022 A1 | 5/2019 |
| WO | 2019204520 A1 | 10/2019 |
| WO | 2019209820 A1 | 10/2019 |
| WO | 2020048960 A1 | 3/2020 |
| WO | 2020173912 A1 | 3/2020 |
| WO | 2020089406 A1 | 5/2020 |
| WO | 2020161245 A1 | 8/2020 |
| WO | 2020182920 A1 | 9/2020 |
| WO | 2021046147 A1 | 3/2021 |
| WO | 2021046434 A1 | 3/2021 |
| WO | 2021058643 A1 | 4/2021 |
| WO | 2021110938 A1 | 6/2021 |
| WO | 2021113501 A1 | 6/2021 |
| WO | 2021155230 A1 | 8/2021 |
| WO | 2021210723 A1 | 10/2021 |
| WO | 2021210966 A1 | 10/2021 |
| WO | 2021214212 A1 | 10/2021 |
| WO | 2022131418 A1 | 6/2022 |
| WO | 2022131419 A1 | 6/2022 |

OTHER PUBLICATIONS

International Application No. PCT/US22/27007, International Search Report and the Written Opinion dated Aug. 30, 2022.

H. Wang et al., Multiclass CBCT Image Segmentation for Orthodontics with Deep Learning, Journal of Dental Research, 2021, vol. 100(9), 943-949, International & American Associates for dental Research 2021.

Yin et al., Algorithm of drawing isoline based on improved Delaunay triangle net, Hubei Province Key Laboratory of Intelligent Information Processing and Real-time Industrial System, Wuhan University of Science and technology, 978-1-5090-6161-7/17/#31.00, 2017, IEEE, pp. 1022-1026.

Cowley et al., The Effect of Gingival-Margin Design on the Retention of Thermoformed Aligners, Nov. 2012 JCO, Inc. vol. XLVI, No. 11, pp. 697-702.

Hanchao Li et al., Pyramid Attention Network for Semantic Segmentation, Nov. 25, 2018, in 13 pages.

Jeremy Zhang, UNet—Line by Line Explanation, Published in Towards Data Science Oct. 17, 2019, in 20 pages.

Joseph Redmon et al., You Only Look Once: Unified, Real-Time Object Detection, University of Washington, Allen Institute for AI, May 9, 2016, in 10 pages, http://pjreddie.com/yolo/.

Joseph Redmon et al., YOLO9000: Better, Faster, Stronger, University of Washington, Dec. 25, 2016, in 9 pages, http://pjreddie.com/yolo9000/.

Joseph Redmon et al., YOLOv3: An Incremental Improvement, University of Washington, Apr. 8, 2018, in 6 pages.

Olaf Ronneberger et al., U-Net: Convolutional Networks for Biomedical Image Segmentation, Computer Science Department and BIOSS Centre for Biological Signalling Studies, University of Freiburg, Germany. May 18, 2015.

Pablo Ruiz, ResNets, Harvard University, Aug. 2018, in 8 pages.

Yu-Bing Chang et al., An Automatic and Robust Algorithm of Reestablishment of Digital dental Occlusion, HHS Public Access, IEEE Trans Med Imaging. Sep. 2010; 29(9) 1652-1663,doi: 10.1109/TMI.2010.2049526, in 36 pages.

YOLO Real Time Objection Detection, downloaded from https://pjreddie.com/darknet/yolo/ on Jun. 10, 2020, in 10 pages.

Shunping Ji, 3D Convolutional Neural Networks for Crop Classification with Multi-Temporal Remote Sensing Images, Remote Sensing, 2018, 10, 75; doi: 10.3390/rs10010075, www.MDPI.com/journal/remotesensing, pp. 1-17.

IMAGOWORKS web page, https://imagoworks.ai/#technology, copyright 2021 downloaded on Feb. 18, 2022, pp. 1-8.

Tsung-Yi Lin et al., Feature Pyramid Networks for Object Detection, arXiv:1612.03144v2 [cs. CV] Apr. 19, 2017, in 10 pages.

Youngjun Kevin Kim, Imagoworks B2B Collaboration Proposal, Sep. 2021, in 32 pages.

Chen et al., A Convolutional Neural Networks for Teeth Margin Detection on 3-Dimensional Dental Meshes, Mesh CNN for Teeth Margin Detection, Jul. 7, 2021, in 11 pages.

Detect Edit Margins-Exocad Wiki, Release from 2022, downloaded Sep. 1, 2023.

Tsung-Yi Lin et al., Focal Loss for Dense Object Detection, arXiv:1708.02002v2 [cs.CV] Feb. 7, 2018, in 10 pages.

Andrew Nealen et al., Laplacian Mesh Optimization, 2006, in 9 pages.

Hang-Nga Mai et al., Reliability of automatic finish line detection for tooth preparation in dental computer-aided software, J.Prosthodont Res. 2023:67(1): 138-143.

Raydent Cad, AI Based Dental CAD Solution brochure, in 7 pages, downloaded Feb. 18, 2022.

Stefan Raith et al., Artificial Neural Networks as a Powerful Numerical Tool to Classify Specific Features of a Tooth Based on 3D Scan Data, Elsevier, Computers in Biology and Medicine 80 (2017) 65-76, in 12 pages.

Mario Botsch, Leif Kobbelt, Mark Pauly, Pierre Alliez, and Bruno Levy, Polygon Mesh Processing, 1st Edition, Copyright 2010, Published Oct. 7, 2010 by A.K. Peters/CRC Press, Ecole Polytechnique Federale de Lausanne, Smoothing Section, in 43 pages.

Ross Girshick, Fast R-CNN, Computer Vision Foundation, accessed Apr. 18, 2015, in pp. 1440-1448.

Jifeng Dai et al., R-FCN: Object Detection via Region-based Fully Convolutional Networks, 30th Conference on Neural Information Processing Systems (NIPS 2016), Barcelona Spain, in 9 pages.

Toshiaki Kondo et al., Tooth Segmentation of Dental Study Models Using Range Images, Research Gate, IEEE Transactions on Medical Imaging, Apr. 2004, vol. 23, No. 3, Mar. 2004, in 14 pages.

Shuai Yang et al., 3D Intelligent Scissors for Dental Mesh Segmentation, Hindawi, Computational and Mathematical Methods in Medicine, vol. 2020, Article ID 1394231, 12 pages.

Shuai Yang et al., Interactive Tooth Segmentation Method of Dental Model based on Geodesic, Research Gate, Conference paper Jan. 2017, Advances in Engineering Research, vol. 138, in 6 pages.

Thibault Groueix et al., A Papier-MâchéApproach to Learning 3D Surface Generation, Computer Vision Foundation, 2018, pp. 216-224.

Xiaotao Hu et al., Enhancing Dental CBCT Image by Semi-coupled Generative Adversarial Networks, Journal of Dental Research, 2016, in 8 pages.

(56) References Cited

OTHER PUBLICATIONS

Charles R. Qi et al., PointNet: Deep Hierarchical Feature Learning on Point Sets in a Metric Space, Stanford University, Jun. 7, 2017, in 14 pages.
Charles R. Qi et al., PointNet: Deep Learning on Pont Sets for 3D Classification and Segmentation, Computer Vision Foundation, 2017, pp. 652-660.
PCT/US2022/027007, Notification Concerning Transmittal of International Preliminary Report on Patentability (Chapter 1 of the Patent Cooperation Treaty), Nov. 10, 2023, in 5 pages.
Mariah Borthwick, Hermes PR, Pearl Granted Patent for AI System Used in Dental Restoration Workflow Automation & Quality Control Solutions, Mar. 30, 2021, in 3 pages.

* cited by examiner

NEURAL NETWORK MARGIN PROPOSAL

BACKGROUND

Specialized dental laboratories typically use computer-aided design (CAD) to design dental prostheses based on patient-specific instructions provided by dentists. Given the digital surface containing a prosthesis such as a preparation, for example, determining the margin line can be desirable.

Traditionally, a fair amount of technician's work was usually devoted to margin line localization for a preparation. In the traditional workflow a separate plaster cast of the preparation was manually created by the technician. One of the main goals of this process was to produce clean and visible margin. Separate plaster cast with an "obvious" margin was scanned, and digital surface is acquired. On such a digital surface the margin line can usually be localized with few clicks using curvature-based geometrical tools.

In the modern workflow, the plaster cast stage is omitted. Either CT-scanning or intraoral scanning is performed instead. Both intraoral and CT scanners produce full jaw digital surfaces without any separate preparation surface. A lot of work can be required in full jaw cases. One cannot rely only on curvature, so the margin line is usually drawn point by point. In subgingival cases, the margin line is missing or covered (partially or completely covered by gum and/or blood & saliva) and is made up by an experienced technician. Precise margin detection in fully automatic mode is not always possible due to variety of shapes, subgingival cases, and the requirement of making the margin line precise. Fully manual margin localization/construction can be tedious and time consuming for the doctor or dental technician.

SUMMARY

A computer-implemented method of automatic margin line proposal can include receiving a 3D digital model of at least a portion of a jaw, the 3D digital model comprising a digital preparation tooth; determining, using a first trained neural network, an inner representation of the 3D digital model; and determining, using a second trained neural network, a margin line proposal from a base margin line and the inner representation of the 3D digital model.

A system for automatic margin line proposal can include a processor; and a computer-readable storage medium comprising instructions executable by the processor to perform steps including: receiving a 3D digital model of at least a portion of a jaw, the 3D digital model comprising a digital preparation tooth; determining, using a first trained neural network, an inner representation of the 3D digital model; and determining, using a second trained neural network, a margin line proposal from a base margin line and the inner representation of the 3D digital model.

A non-transitory computer readable medium storing executable computer program instructions to automatically propose a margin line, the computer program instructions can include: receiving a 3D digital model of at least a portion of a jaw, the 3D digital model comprising a digital preparation tooth; determining, using a first trained neural network, an inner representation of the 3D digital model; and determining, using a second trained neural network, a margin line proposal from a base margin line and the inner representation of the 3D digital model.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1:
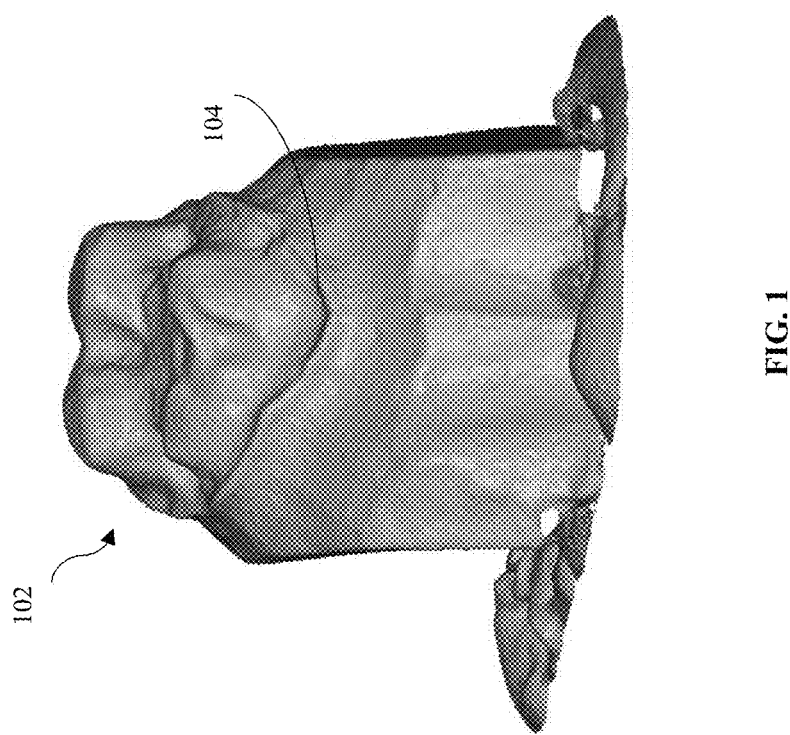
FIG. 1 shows a perspective view of a 3D illustration of an example of a plaster cast.

In the traditional workflow a separate plaster cast of the preparation was manually created by the technician. One of the main goals of this process was to produce clean and visible margin. Separate plaster cast with an "obvious" margin was scanned, and digital surface is acquired. FIG. 1 shows an illustration of a separate plaster cast 102 made with a clearly visible margin line 104, for example.

Figure 2:
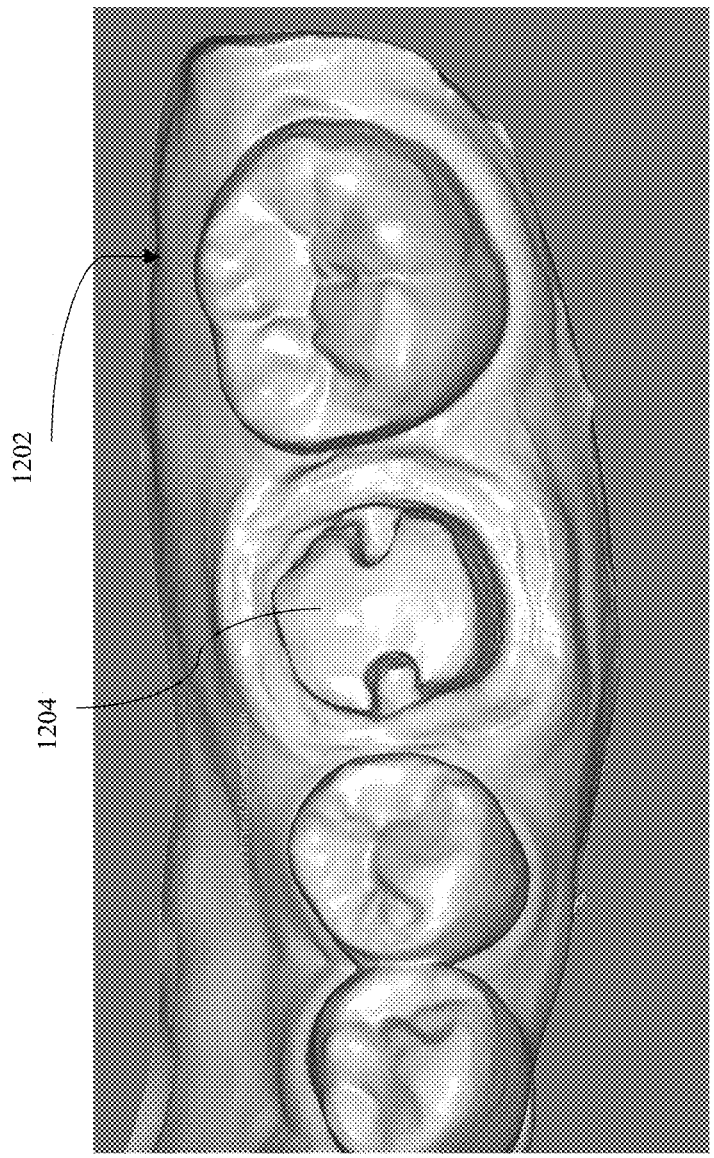
FIG. 2 shows a top perspective view of a 3D digital model of at least a portion of a digital jaw in some embodiments for example.

In the modern workflow the plaster cast stage is omitted. Either CT-scanning or intraoral scanning is performed instead. Both intraoral and CT scanners produce only full jaw digital surfaces without any separate preparation surface. FIG. 2 illustrates an example of a 3D digital model of at least a portion of a digital jaw surface 1202. Although the digital jaw surface 1202 includes a preparation tooth 1204, for example, no margin line is established in the scanned model.

In some embodiments, the computer-implemented method can use one or more trained neural network(s) to determine a margin line proposal in a 3D digital model. In some embodiments, the one or more trained neural networks can perform encoding and decoding. In some embodiments, at least one of the neural networks can be a hierarchal neural network ("HNN") that can be used to perform encoding, for example.

Some embodiments can include receiving a 3D digital model of at least a portion of a jaw. The 3D digital model can include a digital preparation tooth. In some embodiments, the 3D digital model can be generated from a CT scanner. One example of CT scanning is described in U.S. Patent Application No. US20180132982A1 to Nikolskiy et al., which is hereby incorporated in its entirety by reference. Other types of CT scanning systems known in the art can also produce the 3D digital model. A computed tomography (CT) scanner can use x-rays to make a detailed image of a physical impression. A plurality of such images are then combined to form a 3D model of the patient's dentition. The CT scanning system can include a source of x-ray radiation that emits an x-ray beam. An object being scanned can be placed between the source and an x-ray detector. The x-ray detector, in turn, is connected to a processor that is configured to receive the information from the detector and to convert the information into a digital image file. Those skilled in the art will recognize that the processor may comprise one or more computers that may be directly connected to the detector, wirelessly connected, connected via a network, or otherwise in direct or indirect communication with the detector 148.

An example of a suitable scanning system includes a Nikon Model XTH 255 CT Scanner which is commercially available from Nikon Corporation. The example scanning system includes a 225 kV microfocus x-ray source with a 3 μm focal spot size to provide high performance image acquisition and volume processing. The processor may include a storage medium that is configured with instructions to manage the data collected by the scanning system. As noted above, during operation of the scanning system, the impression is located between the x-ray source and the x-ray detector. A series of images of the impression are collected by the processor as the impression is rotated in place between the source and the detector. An example of a single image. The image may be a radiograph, a projection, or other form of digital image. In one embodiment, a series of images are collected as the impression is rotated in place between the source and the detector. In other embodiments, more images or fewer images may be collected as will be understood by those skilled in the art. The plurality of images of the impression are generated by and stored within a storage medium contained within the processor of the scanning system, where they may be used by software contained within the processor to perform additional operations. For example, in an embodiment, the plurality of images undergo tomographic reconstruction in order to generate a 3D virtual image from the plurality of 2D images generated by the scanning system. The 3D virtual image is in the form of a volumetric image or volumetric density file that is generated from the plurality of radiographs by way of a reconstruction algorithm associated with the scanning system. The volumetric density file can contain one or more voxels. In one embodiment, the volumetric image is converted into a surface image using a surface imaging algorithm. In the embodiment shown, the volumetric image is converted into a surface image having a format (e.g., an .STL file format) that is suitable for use with a dental restoration design software, such as the FastDesign™ dental design software provided by Glidewell Laboratories of Newport Beach, Calif.

In some embodiments, the 3D digital model can be generated from an optical scanner. For example, in some embodiments, the 3D digital model can be generated by an intra oral scanner or other device. The digital jaw model can also be generated by intraoral scanning of the patient's dentition, for example. In some embodiments, each electronic image is obtained by a direct intraoral scan of the patient's teeth. This will typically take place, for example, in a dental office or clinic and be performed by a dentist or dental technician. In other embodiments, each electronic image is obtained indirectly by scanning an impression of the patient's teeth, by scanning a physical model of the patient's teeth, or by other methods known to those skilled in the art. This will typically take place, for example, in a dental laboratory and be performed by a laboratory technician. Accordingly, the methods described herein are suitable and applicable for use in chair side, dental laboratory, or other environments.

Figure 3:
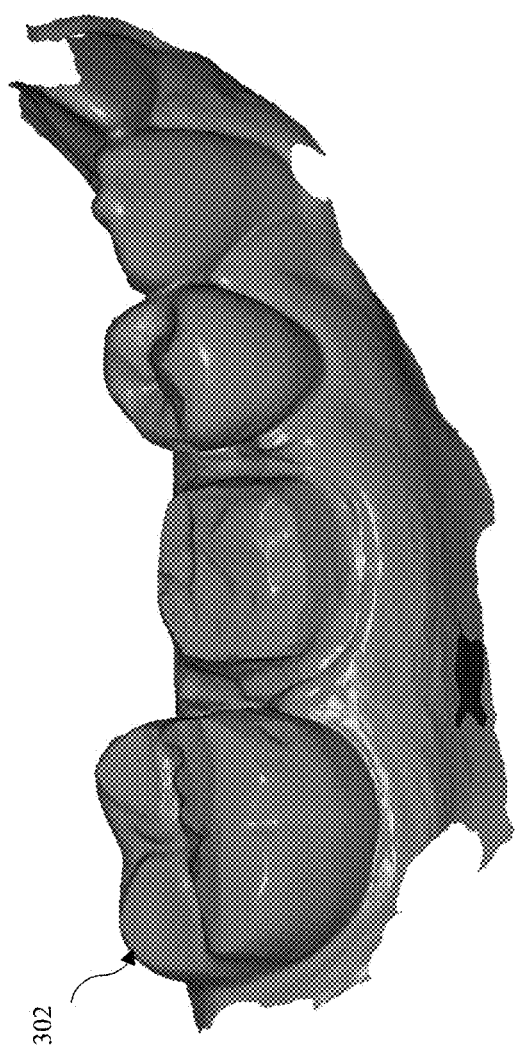
FIG. 3 shows a perspective view of a 3D digital mode of at least a portion of a digital jaw in some embodiments for example.

FIG. 3 illustrates one example of a digital jaw model 302. The digital jaw model can be generated by scanning a physical impression using any scanning technique known in the art including, but not limited to, for example, optical scanning, CT scanning, etc. or by intraoral scanning of the patient's mouth (dentition). A conventional scanner typically captures the shape of the physical impression/patient's dentition in 3 dimensions during a scan and digitizes the shape into a 3 dimensional digital model. The digital jaw model 302 can include multiple interconnected polygons in a topology that corresponds to the shape of the physical impression/patient's dentition, for example, for a corresponding jaw. In some embodiments, the polygons can include two or more digital triangles. In some embodiments, the scanning process can produce STL, PLY, or CTM files, for example that can be suitable for use with a dental design software, such as FastDesign™ dental design software provided by Glidewell Laboratories of Newport Beach, Calif.

In some embodiments, the 3D digital model can be a 3D digital point cloud. In the case of optical scanning, an optical scanner can emit light beams to scan and digitize a physical dental impression, such as any dental impression, for example. Alternatively, the optical scanner can scan a patient's dentition directly, such as in the case of an intraoral scanner. Data obtained from scanning the surface of the physical dental impression/dentition may be in the form of sets of points, or point clouds, triangles, or digital surface meshes. A 3D model may digitally represent a physical dental impression or dentition, for example, by using a collection of points in 3D space connected by various geometric entities such as triangles. The scan may be stored locally, or remotely, for example, for use in the methods described herein. The scan may be saved as a 3D scan, as point clouds or digital surface meshes for use in the methods described herein.

In the case of CT scanning, the digital surface mesh and digital dental model can be created/determined using methods described in the application PROCESSING CT SCAN OF DENTAL IMPRESSION, Ser. No. 16/451,315 (U.S. Patent Publication No. US20200405455A1), assigned to the assignee of this application, and which is hereby incorporated by reference in its entirety, by Marching Cubes, or by other digital model generation methods and techniques known in the art.

For example, the point cloud can be generated and/or adjusted (reduced) by the computer-implemented method automatically. The computer-implemented method receives as input a volumetric density file generated by a CT scanner. The volumetric density file can contain voxels representing density values at the voxel position in the volumetric density volume. The computer-implemented method compares a selected iso-value of density to densities of one or more voxels in a volumetric density file and generates digital surface points at the selected iso-value of density in a point cloud. The iso-value of density can be a selectable value that can be chosen by a user and/or can be automatically determined in some embodiments. In some embodiments, if the selected iso-value of density corresponds to the density of one or more voxels in the volumetric density file, then digital surface points can be generated and arranged in virtual 3D space at position(s) in the point cloud corresponding to position(s) of one or more voxels in the volumetric density file by the computer-implemented method. In some embodiments, as discussed below, if the selected iso-value of density is between two voxel density values, then zero or more digital surface points can be generated and arranged in virtual 3D space in position(s) corresponding to position(s) between two voxel positions along a voxel edge by the computer-implemented method. The computer-implemented method can optionally adjust the point cloud. The computer-implemented method can generate a digital surface mesh for either the point cloud or the adjusted point cloud.

Figure 4:
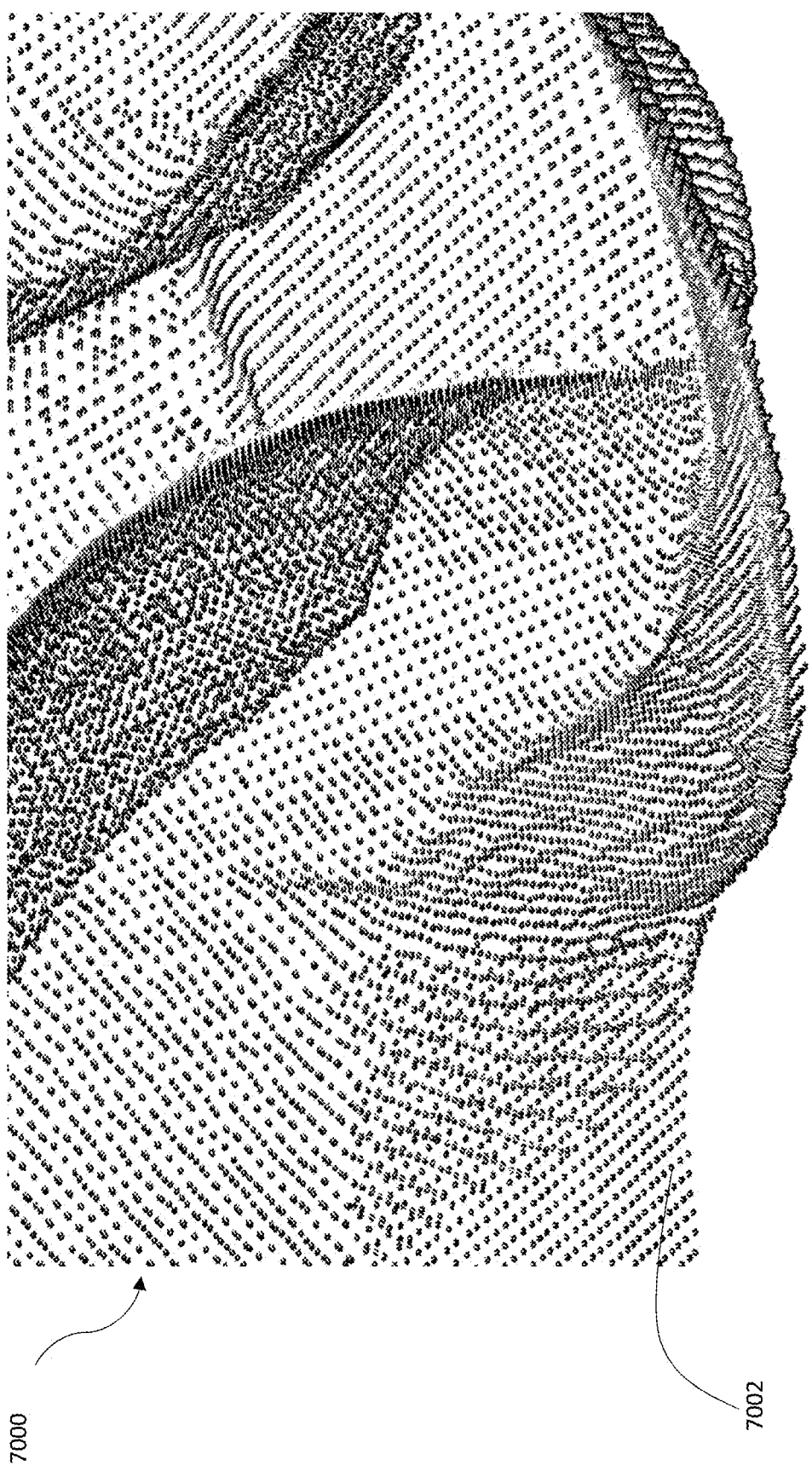
FIG. 4 shows a perspective view of a 3D digital point cloud in some embodiments for example.

FIG. 4 shows an example of a generated point cloud 7000 viewable on a display in some embodiments. Generated point cloud 7000 includes generated digital surface points such as digital surface point 7002 at every position of the selected iso-value of density in virtual 3D space.

In some embodiments, the 3D point cloud can include augmented information. The augmented information can include additional geometrical data beyond point coordinates such as, for example, surface normal directions, mean curvature values, and/or color from the generated digital surface mesh. Normal directions can be those that are orthogonal to a plane such as a digital surface for a given point. In some embodiments, the 3D point cloud can include a mesh representation, and the augmented information can be obtained from the generated digital surface mesh.

Figure 5:
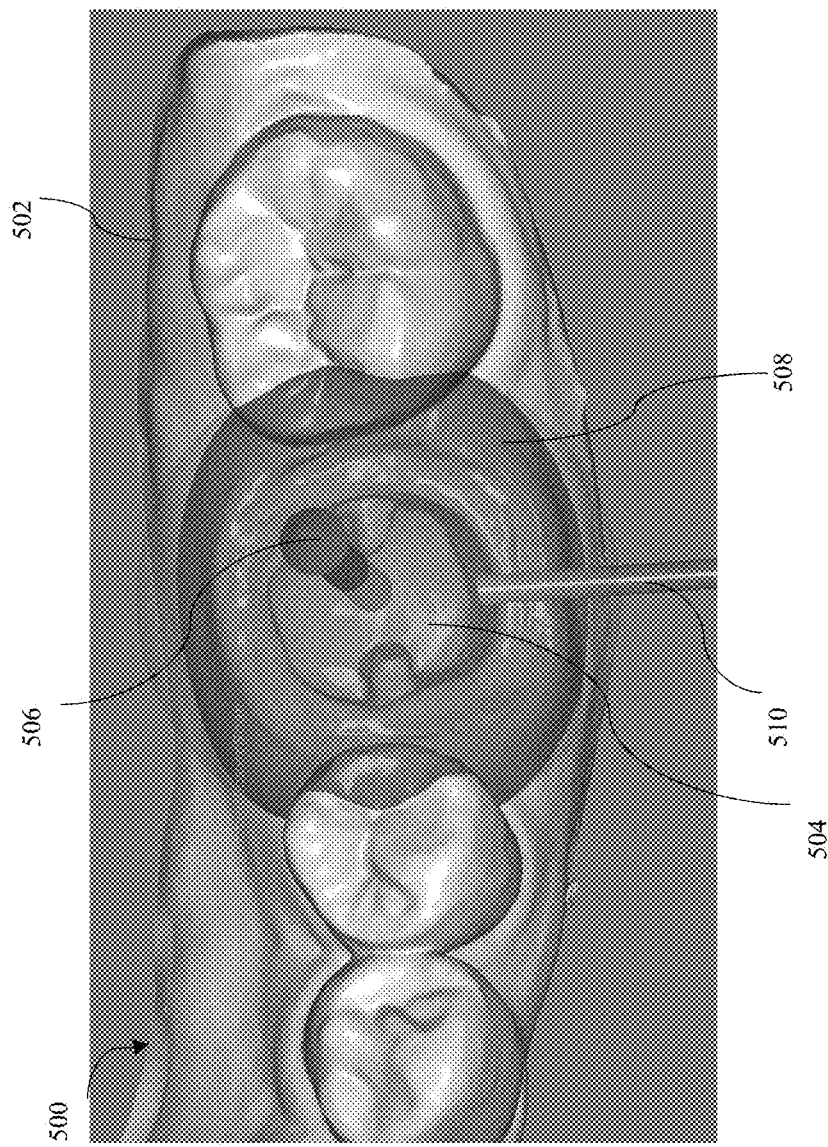
FIG. 5 shows a top perspective view of a 3D digital model of at least a portion of a digital jaw with a set occlusal direction, preparation die, and buccal direction in some embodiments for example.

In some embodiments, the 3D digital model can include an occlusion direction, a buccal direction, and/or a preparation die region. In some embodiments, these features can provide a normalized orientation of the 3D digital model, for example. For example, the occlusal direction is a normal to an occlusal plane, the digital preparation die can be a region around the digital preparation tooth, and the buccal direction can be a direction toward the cheek in the mouth. FIG. 5 illustrates an example of a 3D digital model 500 of at least a portion of a patient's dentition that can include, for example a digital jaw 502 that includes a digital preparation tooth 504. The 3D digital model 500 can include an occlusion direction 506, a digital preparation die region 508, and a buccal direction 510.

In some embodiments, the 3D digital model can include an occlusion direction. The occlusal direction can be determined for the digital model using any technique known in the art. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968, of Nikolskiy et al. (U.S. Patent Publication No. US20200405464A1), the entirety of which is incorporated by reference herein. In some embodiments, the occlusion direction can be determined once per 3D digital model. Alternatively, the occlusion direction can be determined automatically in some embodiments.

In some embodiments, the occlusion direction can be determined using a trained 3D convolutional neural network ("CNN") on the volumetric (voxel) representation. In some embodiments, the DNN can be a convolutional neural network ("CNN"), which is a network that uses convolution in place of the general matrix multiplication in at least one of the hidden layers of the deep neural network. A convolution layer can calculate its output values by applying a kernel function to a subset of values of a previous layer. The computer-implemented method can train the CNN by adjusting weights of the kernel function based on the training data. The same kernel function can be used to calculate each value in a particular convolution layer.

Figure 6:
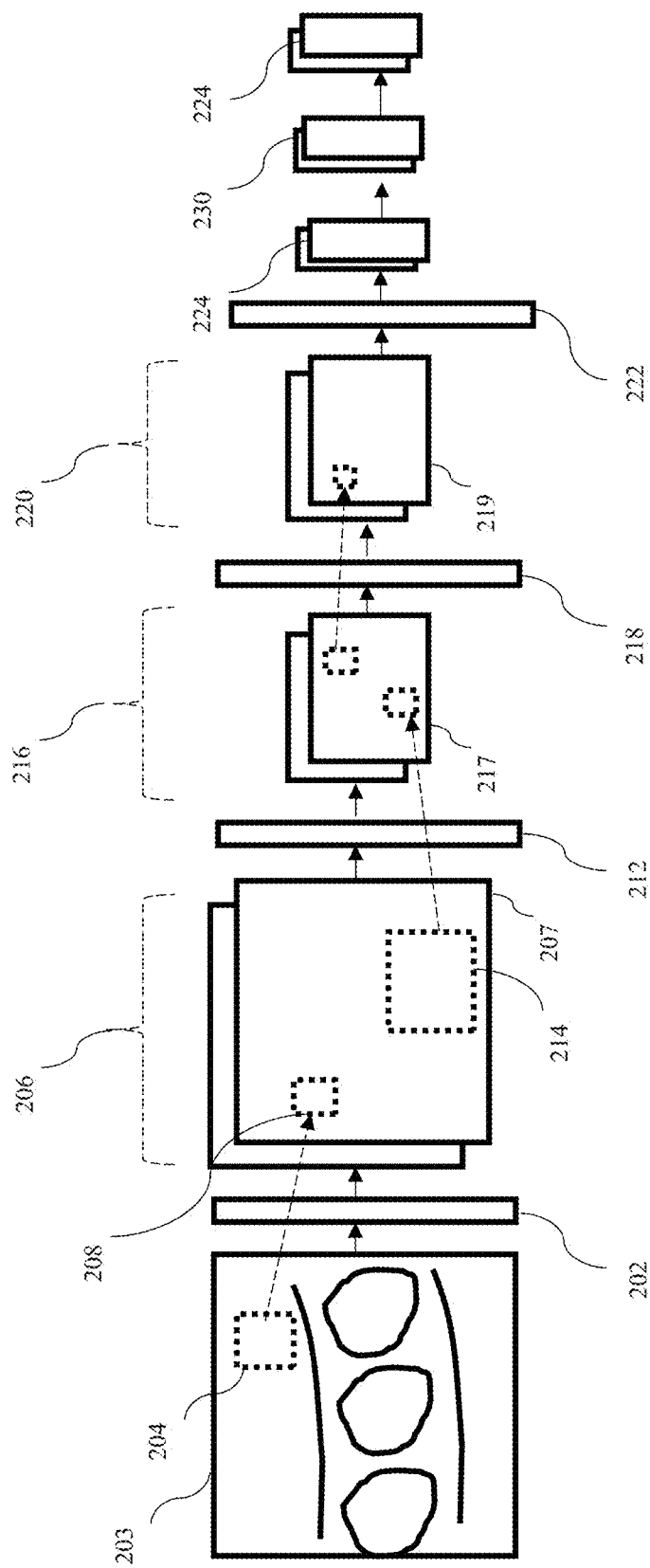
FIG. 6 shows a diagram of a convolutional neural network in some embodiments for example.

FIG. 6 illustrates an example of a CNN in some embodiments. For illustration purposes, a 2D CNN is shown. A 3D CNN can have a similar architecture, but use a three dimensional kernel (x-y-z axis) to provide a three dimensional output after each convolution. The CNN can include one or more convolution layers, such as first convolution layer 202. The first convolution layer 202 can apply a kernel (also referred to as a filter) such as kernel 204 across an input image such as input image 203 and optionally apply an activation function to generate one or more convolution outputs such as first kernel output 208. The first convolution layer 202 can include one or more feature channels. The application of the kernel such as kernel 204 and optionally an activation function can produce a first convoluted output such as convoluted output 206. The kernel can then advance to the next set of pixels in the input image 203 based on a stride length and apply the kernel 204 and optionally an activation function to produce a second kernel output. The kernel can be advanced in this manner until it has been applied to all pixels in the input image 203. In this manner, the CNN can generate a first convoluted image 206, which can include one or more feature channels. The first convoluted image 206 can include one or more feature channels such as 207 in some embodiments. In some cases, the activation function can be, for example, a RELU activation function. Other types of activation functions can also be used.

The CNN can also include one or more pooling layers such as first pooling layer 212. First pooling layer can apply a filter such as pooling filter 214, to the first convoluted image 206. Any type of filter can be used. For example, the filter can be a max filter (outputting the maximum value of the pixels over which the filter is applied) or an average filter (outputting the average value of the pixels over which the filter is applied). The one or more pooling layer(s) can down sample and reduce the size of the input matrix. For example, first pooling layer 212 can reduce/down sample first convoluted image 206 by applying first pooling filter 214 to provide first pooled image 216. The first pooled image 216 can include one or more feature channels 217. The CNN can optionally apply one or more additional convolution layers (and activation functions) and pooling layers. For example, the CNN can apply a second convolution layer 218 and optionally an activation function to output a second convoluted image 220 that can include one or more feature channels 219. A second pooling layer 222 can apply a pooling filter to the second convoluted image 220 to generate a second pooled image 224 that can include one or more feature channels. The CNN can include one or more convolution layers (and activation functions) and one or more corresponding pooling layers. The output of the CNN can be optionally sent to a fully connected layer, which can be part of one or more fully connected layers 230. The one or more fully connected layers can provide an output prediction such as output prediction 224. In some embodiments, the output prediction 224 can include labels of teeth and surrounding tissue, for example.

In some embodiments, the trained occlusion direction 3D CNN can be trained using one or more 3D voxel representations, each representing a patient's dentition, optionally with augmented data such as surface normal for each voxel. 3D CNNs can perform 3D convolutions, which use a 3D kernel instead of a 2D kernel, and operate on 3D input. In some embodiments, the trained 3D CNN receives 3D voxel representations with voxel normals. In some embodiments, a N×N×N×3 float tensor can be used. In some embodiments, N can be 100, for example. Other suitable values of N can be used. In some embodiments, the trained 3D CNN can include 4 levels of 3D convolutions and can include 2 linear layers. In some embodiments, a training set for the 3D CNN can include one or more 3D voxel representations, each representing a patient's dentition. In some embodiments, each 3D voxel representation in the training set can include an occlusal direction marked manually by a user or by other techniques known in the art. In some embodiments, the training set can include tens of thousands of 3D voxel representations, each with a marked occlusion direction. In some embodiments, the training dataset can include 3D point cloud models with marked occlusion direction in each 3D point cloud model.

In some embodiments, the 3D digital model can include a 3D center of the digital preparation die. In some embodiments, the 3D center of the digital preparation die can be set manually by a user. In some embodiments, the 3D center of the digital preparation die can be set using any technique known in the art.

In some embodiments, the 3D center of the digital preparation die can be determined automatically. For example, in some embodiments, the 3D center of the digital preparation can be determined using a neural network on an occlusally aligned 3D point cloud. In some embodiments, the trained neural network can provide a 3D coordinate of a center of digital preparation bounding box. In some embodiments, the neural network can be any neural network that can perform segmentation on a 3D point cloud. For example, in some embodiments, the neural network can be a PointNet++ neural network segmentation as described in the present disclosure. In some embodiments, the digital preparation die can be determined by a sphere of a fixed radius around the 3D center of the digital preparation. In some embodiments, the fixed radius can be 0.8 cm for molar and premolars, for example. Other suitable values for the fixed radius can be determined and used in some embodiments, for example. In some embodiments, training the neural network can include using the sampled pointcloud (without augmentation) of the digital jaw, centered in the center of mass of the jaw. In some embodiments, the digital jaw point cloud can be oriented in such a way that the occlusal direction positioned vertically. In some embodiments, a training dataset can include 3D digital models of point clouds of a patient's dentition such as a digital jaw that can include a preparation tooth, with one or more points within the margin line of the preparation tooth marked by user using an input device, or any technique known in the art. In some embodiments, the neural network can utilize segmentation to return a bounding box containing the selected points. In some embodiments, the segmentation used can be PointNet++ segmentation, for example. In some embodiments, the training set can be in the tens of thousands.

In some embodiments, the 3D center of the digital preparation die can be determined automatically based on a flat depth map image of the jaw. In the training dataset, the position of a die center can be determined as a geometrical center of margin marked by technicians. In some embodiments, final margin points from completed cases could be used. In some embodiments, the network can receive a depth map image of a jaw from occlusal view and return a position (X, Y) of a die center in the pixel coordinates of the image. For training, a dataset that contains depth map images and corresponding correct answer—float X and Y values—can be used. In some embodiments, the training set can be in the tens of thousands.

In some embodiments, the 3D digital model can include a buccal direction. In some embodiments, the buccal direction is set manually by a user. In some embodiments, the buccal direction can be determined using any technique known in the art. In some embodiments, the buccal direction can be determined automatically. In some embodiments, the buccal direction can be determined by providing a 2D depth map image of the 3D digital model mesh to a trained 2D CNN. In some embodiments, the trained 2D CNN operates on the image representation. Some embodiments of the computer-implemented method can optionally include generating a 2D image from the 3D digital model. In some embodiments, the 2D image can be a 2D depth map. The 2D depth map can include a 2D image that contains in each pixel a distance from an orthographic camera to an object along a line passing through the pixel. The object can be, for example, a digital jaw model surface, in some embodiments, for example. In some embodiments, an input can include, for example, an object such as a 3D digital model of patient's dentition ("digital model"), such as a jaw, and a camera orientation. In some embodiments, the camera orientation can be determined based on an occlusion direction. The occlusal direction is a normal to an occlusal plane and the occlusal plane can be determined for the digital model using any technique known in the art. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968 (U.S. Patent Publication No. US20200405464A1), of Nikolskiy et al., the entirety of which is incorporated by reference herein.

Figure 7:
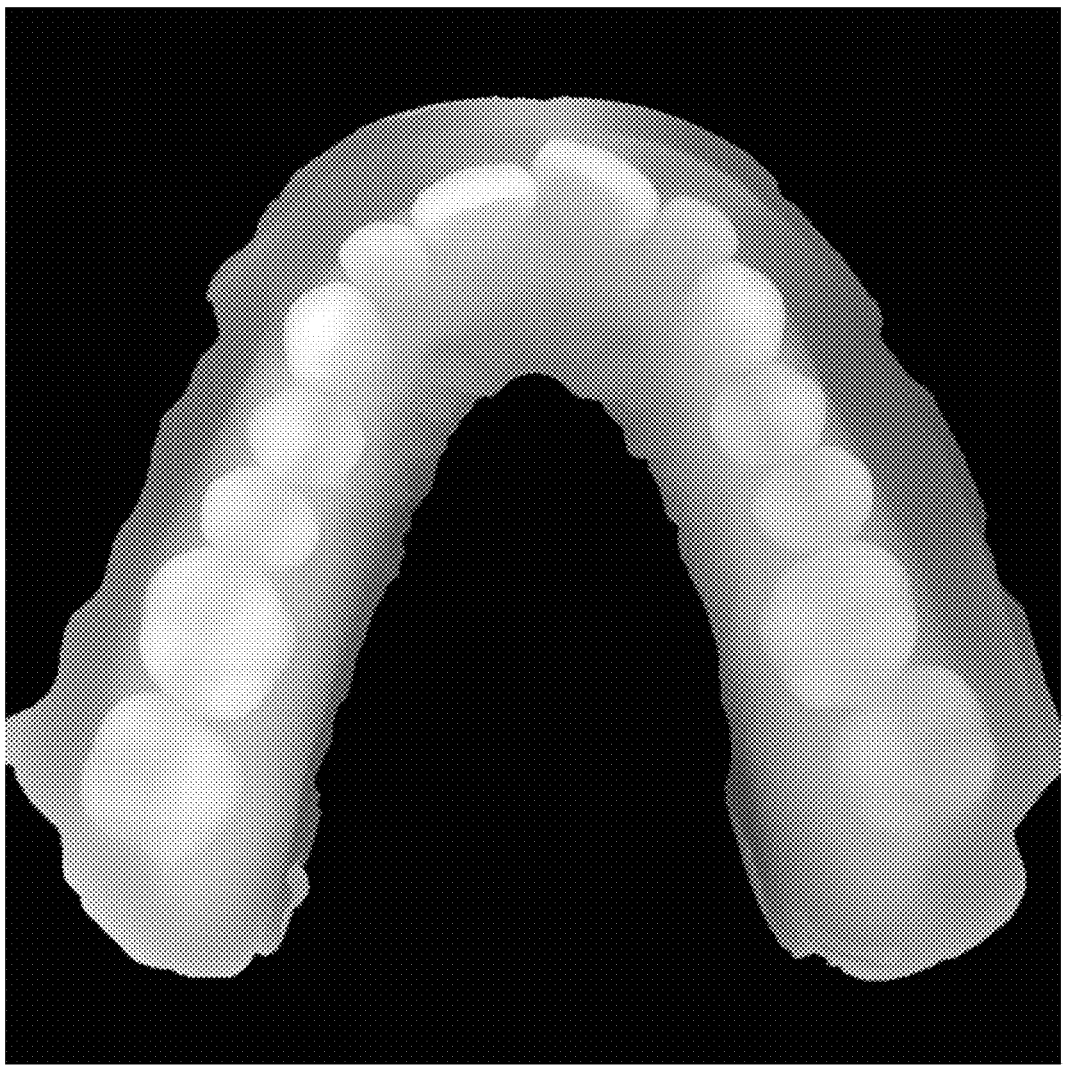
FIG. 7 shows a top perspective view of an example of a 2D depth map of a digital model in some embodiments for example.

The 2D depth map can be generated using any technique known in the art, including, for example z-buffer or ray tracing. For example, in some embodiments, the computer-implemented method can initialize the depth of each pixel (j, k) to a maximum length and a pixel color to a background color, for example. The computer-implemented method can for each pixel in a polygon's projection onto a digital surface such as a 3D digital model determine a depth, z of the polygon at (x, y) corresponding to pixel (j, k). If z<depth of pixel (j, k), then set the depth of the pixel to the depth, z. "Z" can refer to a convention that the central axis of view of a camera is in the direction of the camera's z-axis, and not necessarily to the absolute z axis of a scene. In some embodiments, the computer-implemented method can also set a pixel color to something other than a background color for example. In some embodiments, the polygon can be a digital triangle, for example. In some embodiments, the depth in the map can be per pixel. FIG. 7 illustrates an example of a 2D depth map of a digital model in some embodiments.

In some embodiments, 2D depth map image can include a Von Mises average of 16 rotated versions of the 2D depth map. In some embodiments, the buccal direction can be determined after determining occlusal direction and the 3D center of the digital preparation die. In some embodiments, the 2D depth map image can be of a portion of the digital jaw around the digital preparation die. In some embodiments, regression can be used to determine the buccal direction. In some embodiments, the 2D CNN can include GoogleNet Inception v3, known in the art, for example. In some embodiments, the training dataset can include buccal directions marked in a 3D point cloud model, for example. In some embodiments, the training data set can include tens of thousands to hundreds of thousands of images.

Some embodiments of the computer-implemented method can include determining, using a first trained neural network, an inner representation of the 3D digital model. In some embodiments, the first trained neural network can include an encoder neural network. In some embodiments, the first trained neural network can include a neural network for 3D point cloud analysis. In some embodiments, the first trained neural network can include a trained hierarchal neural network ("HNN"). In some embodiments, the HNN can include a PointNet++ neural network. In some embodiments, the HNN can be any message-passing neural network that operates on geometrical structures. In some embodiments, the geometrical structures can include graphs, meshes, and/or point clouds.

In some embodiments, the computer-implemented method can use an HNN such as PointNet++ for encoding. PointNet++ is described in "PointNet++: Deep Hierarchical Feature Learning on Point Sets in a Metric Space", Charles R. Qi, Li Yi, Hao Su, Leonidas J. Guibas, Stanford University, June 2017, the entirety of which is hereby incorporated by reference. Hierarchal neural networks can, for example, process a sampled set of points in a metric space in a hierarchal way. An HNN such as PointNet++ or other HNN can be implemented by determining a local structure induced by a metric in some embodiments. In some embodiments, the HNN such as PointNet++ or other HNN can be implemented by first partitioning a set of points into two or more overlapping local regions based on the distance metric. The distance metric can be based on the underlying space. In some embodiments, the local features can be extracted. For example, in some embodiments, granular geometric structures from small local neighborhoods can be determined. The small local neighborhood features can be grouped into larger units in some embodiments. In some embodiments, the larger units can be processed to provide higher level features. In some embodiments, the process is repeated until all features of the entire point set are obtained. Unlike volumetric CNNs that scan the space with fixed strides, local receptive fields in HNNs such as PointNet++ or other HNN are dependent on both the input data and the metric. Also, in contrast to CNNs that scan the vector space agnostic of data distribution, the sampling strategy in HNNs such as PointNet++ or other HNN generates receptive fields in a data dependent manner.

In some embodiments, the HNN such as PointNet++ or other HNN can, for example, determine how to partition the point set as well as abstract sets of points or local features with a local feature learner. In some embodiments, the local feature learner can be PointNet, or any other suitable feature learner known in the art, for example. In some embodiments, the local feature learner can process a set of points that are unordered to perform semantic feature extraction, for example. The local feature learner can abstract one or more sets of local points/features into higher level representations. In some embodiments, the HNN can apply the local feature learner recursively. For example, in some embodiments, PointNet++ can apply PointNet recursively on a nested portioning of an input set.

In some embodiments, the HNN can define partitions of a point set that overlap by defining each partition as a neighborhood ball in Euclidean space with parameters that can include, for example, a centroid location and a scale. The centroids can be selected from the input set by farthest point sampling known in the art, for example. One advantage of using an HNN can include, for example, efficiency and effectiveness since local receptive fields can be dependent on input data and the metric. In some embodiments, the HNN can leverage neighborhoods at multiple scales. This can, for example, allow for robustness and detail capture.

In some embodiments, the HNN can include hierarchical point set feature learning. The HNN can build hierarchal grouping of points and abstract larger and larger local regions along the hierarchy in some embodiments, for example. In some embodiments, the HNN can include a number of set abstraction levels. In some embodiments, a set of points is processed at each level and abstracted to produce a new set with fewer elements. In some embodiments, a set abstraction level can, in some embodiments, include three layers: sampling layer, grouping layer, and a local feature learner layer. In some embodiments, the local feature learner layer can be PointNet, for example. A set abstraction level can take an input of a N×(d+C) matrix that is from N points with d-dim coordinates and C-dim point feature and output a N'×(d+C') matrix of N' subsampled points with d-dim coordinates and new C'-dim feature vectors that can summarize local context in some embodiments, for example.

The sampling layer can, in some embodiments, select or sample a set of points from input points. The HNN can define these selected/sampled points as centroids of local regions in some embodiments, for example. For example, for input points $\{x_1, x_2, \ldots, x_n\}$ to the sampling layer, iterative farthest point sampling (FPS) can be used to choose a subset of points $\{x_{i_1}, x_{i_2}, \ldots, x_{i_m}\}$ such that $x_{ij}$ is the most distant point in metric distance from the set $\{x_{i_1}, x_{i_2}, \ldots, x_{i_{j-1}}\}$ with respect to the rest points in some embodiments. This can advantageously provide, for example, better coverage of the whole point set given the same centroid number versus random sampling. This can also advantageously generate, for example, receptive fields in a way that is data dependent versus convolution neural networks (CNNs) which scan vector space independent of data distribution.

The grouping layer can determine one or more local region sets by determining neighboring points around each centroid in some embodiments, for example. In some embodiments, the input to this layer can be a point set of size N×(d+C) and coordinates of a centroids having the size N'×d. In some embodiments, the output of the grouping layer can include, for example groups of point sets having size N'×K×(d+C). Each group can correspond to a local region and K can be the number of points within a neighborhood of centroid points in some embodiments, for example. In some embodiments, K can vary from group to group. However, the next layer—the PointNet layer—can convert the flexible number of points into a fixed length local region feature vector, for example. The neighborhood can, in some embodiments, be defined by metric distance, for example. Ball querying can determine all points within a radius to the query point in some embodiments, for example. An upper limit for K can be set. In an alternative embodiment, a K nearest neighbor (kNN) search can be used. kNN can determine a fixed number of neighboring points. However, ball query's local neighborhood can guarantee a fixed region scale, thus making one or more local region features more generalizable across space in some embodiments, for example. This can be preferable in some embodiments for semantic point labeling or other tasks that require local pattern recognition, for example.

In some embodiments, the local feature learner layer can encode local region patterns into feature vectors. For example, given that X=(M, d)) is a discrete metric space whose metric is inherited from a Euclidean space $X^n$, where $M \subseteq R^n$ is the set of points and d is the distance metric, the local feature learner layer can determine functions $f$ that take X as input and output semantically interesting information regarding X. The function $f$ can be a classification function assigning a label to X or a segmentation function which assigns a per point label to each member of M.

Some embodiments can use PointNet as the local feature learner layer, which can, given an unordered point set $\{x_1, x_2, \ldots, x_n\}$ with $x_i \in R^d$, define a set function f: X→R that maps a set of points to a vector such as, for example:

$$f(x_1, x_2, \ldots, x_n) = \gamma(\underset{i=1,\ldots,n}{MAX} \{h(x_i)\}).$$

In some embodiments, γ and h can be, multi-layer perceptron (MLP) networks for example, or other suitable alternatives known in the art. The function $f$ can be invariant to input point permutations and can approximate any continuous set function in some embodiments, for example. The response of h in some embodiments can be interpreted as a spatial encoding of a point. PointNet is described in "PointNet: Deep Learning on Point Sets for 3D Classification and Segmentation," 2017 IEEE Conference on Computer Vision and Pattern Recognition (CVPR), 2017, pp. 77-85, by R. Q. Charles, H. Su, M. Kaichun and L. J. Guibas, the entirety of which is hereby incorporated by reference.

In some embodiments, the local feature learner layer can receive N' local regions of points. The data size can be, for example, N'×K×(d+C). In some embodiments, each local region is abstracted by its centroid and local features that encodes the centroid's neighborhood, for example, in the output. The output data size can be, for example, N'×(d+C). Coordinates of points in a local region can be translated into a local frame relative to the centroid point in some embodiments: $x_i^{(j)} = x_i^{(j)} - \hat{x}^{(j)}$ for i=1, 2, ..., K and j=1, 2, ..., d where $\hat{x}$ is the centroid coordinate in some embodiments, for example. In some embodiments, using relative coordinates with point features can capture point-to-point relations in a local region, for example. In some embodiments, PointNet can be used for local pattern learning.

In some embodiments, the local feature learner can address non-uniform density in the input point set through density adaptive layers, for example. Density adaptive layers can learn to combine features of differently scaled regions when the input sampling density changes. In some embodiments, the density adaptive hierarchical network is a PointNet++ network, for example. Density adaptive layers can include multi-scale grouping ("MSG") or Multi-resolution grouping ("MRG") in some embodiments, for example.

In MSG, multiscale patterns can be captured by applying grouping layers with different scales followed by extracting features of each scale in some embodiments. Extracting features of each scale can be performed by utilizing PointNet in some embodiments, for example. In some embodiments, features at different scales can be concatenated to provide a multi-scale feature, for example. In some embodiments, the HNN can learn optimized multi-scale feature combining by training. For example, random input dropout in which random input points are dropped input points with randomized probability can be used. As an example, a dropout ratio of Θ that is uniformly sampled from [0,p], where p is less than or equal to 1 can be used in some embodiments, for example. As an example, p can be set to 0.95 in some cases so that empty point sets are not generated. Other suitable values can be used in some embodiments, for example.

In MRG, features of one region at a level $L_i$, for example, can be a concatenation of two vectors, with a first vector obtained by summarizing features at each subregion from a lower level $L_{i-1}$ in some embodiments, for example. This can be accomplished using the set abstraction level. A second vector can be the feature obtained by directly processing local region raw points using, for example a single PointNet in some embodiments. In cases where a local region density is low, the second vector can be weighted more in some embodiments since the first vector contains fewer points and includes sampling deficiencies. In cases where a local region density is high, for example, the first vector can be weighted more in some embodiments since the first vector can provide finer details due to inspection at higher resolutions recursively at lower levels.

In some embodiments, point features can be propagated for set segmentation. For example, in some embodiments a hierarchical propagation strategy can be used. In some embodiments, feature propagation can include propagating point features from $N_l \times (d+C)$ points to $N_{l-1}$ points, where $N_{l-1}$ and $N_l$ ($N_l$ is less than or equal to $N_{l-1}$) are point set size of input and output of set abstraction level l. In some embodiments, feature propagation can be achieved through interpolation of feature values $f$ of $N_l$ points at coordinates of the $N_{l-1}$ points. In some embodiments, an inverse distance weighted average based on k nearest neighbors can be used, for example (p=2, k=3 in equation below; other suitable values can be used). Interpolated features on $N_{l-1}$ can be concatenated with skip linked point features from the set abstraction level in some embodiments, for example. In some embodiments, concatenated features can be passed through a unit PointNet, which can be similar to a one-by-one convolution in convolutional neural networks, for example. Shared fully connected and ReLU layers can be applied to update each point's feature vector in some embodiments, for example. In some embodiments, the process can be repeated until propagated features to the original set of points are determined.

$$f^{(j)}(x) = \frac{\sum_{i=1}^{k} w_i(x) f_i^{(j)}}{\sum_{i=1}^{k} w_i(x)} \text{ where } w_i(x) = \frac{1}{d(x, x_i)^p}, j = 1, \ldots, C$$

In some embodiments, the computer-implemented method can implement one or more neural networks as disclosed or as are known in the art. Any specific structures and values with respect to one or more neural networks and any other features as disclosed herein are provided as examples only, and any suitable variants or equivalents can be used. In some embodiments, one or more neural network models can be implemented on the base of the Pytorch-geometric package as an example.

Figure 8A:
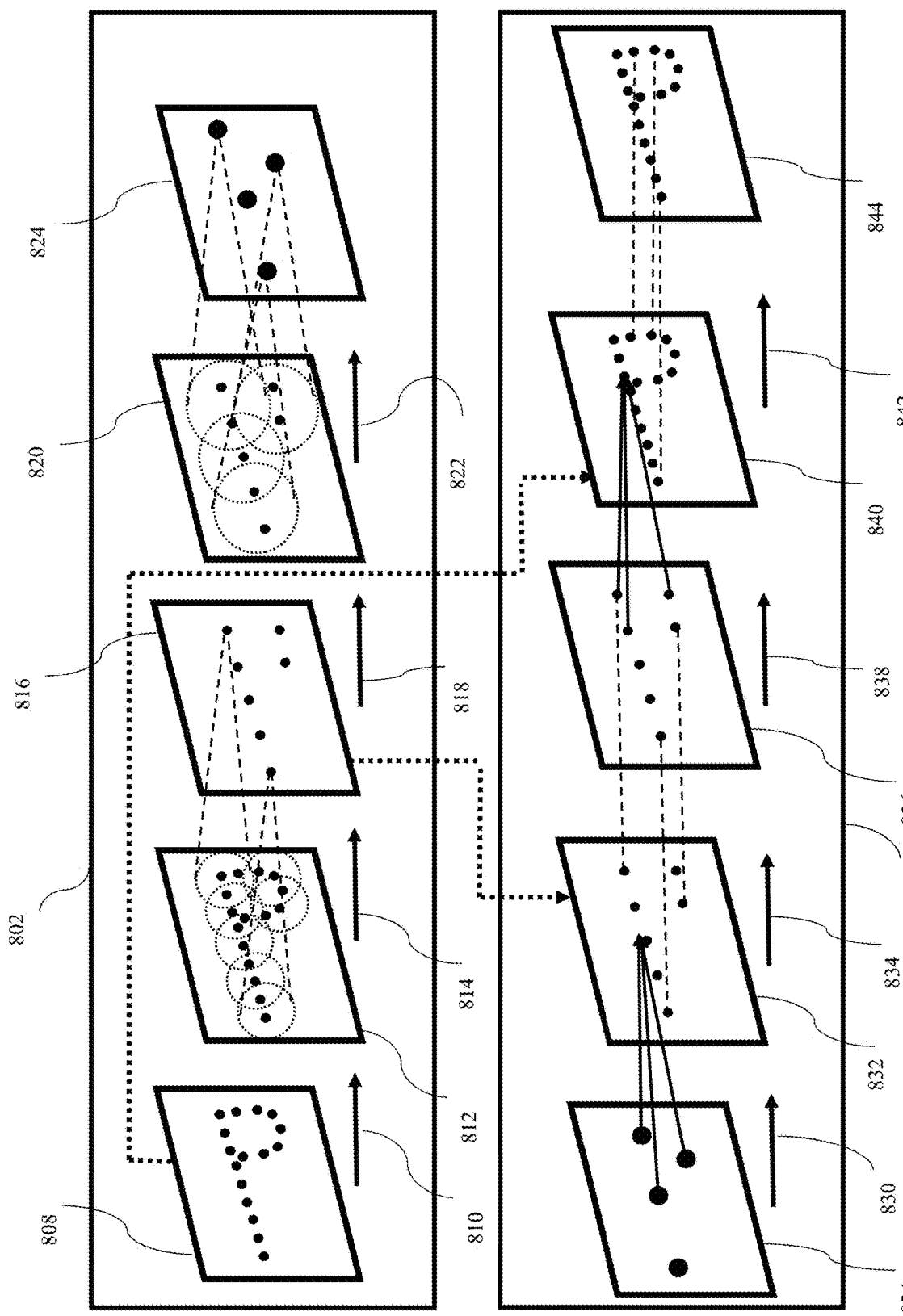
FIGS. 8(a) and 8(b) show diagrams of a hierarchical neural network in some embodiments for example.
Figure 8B:
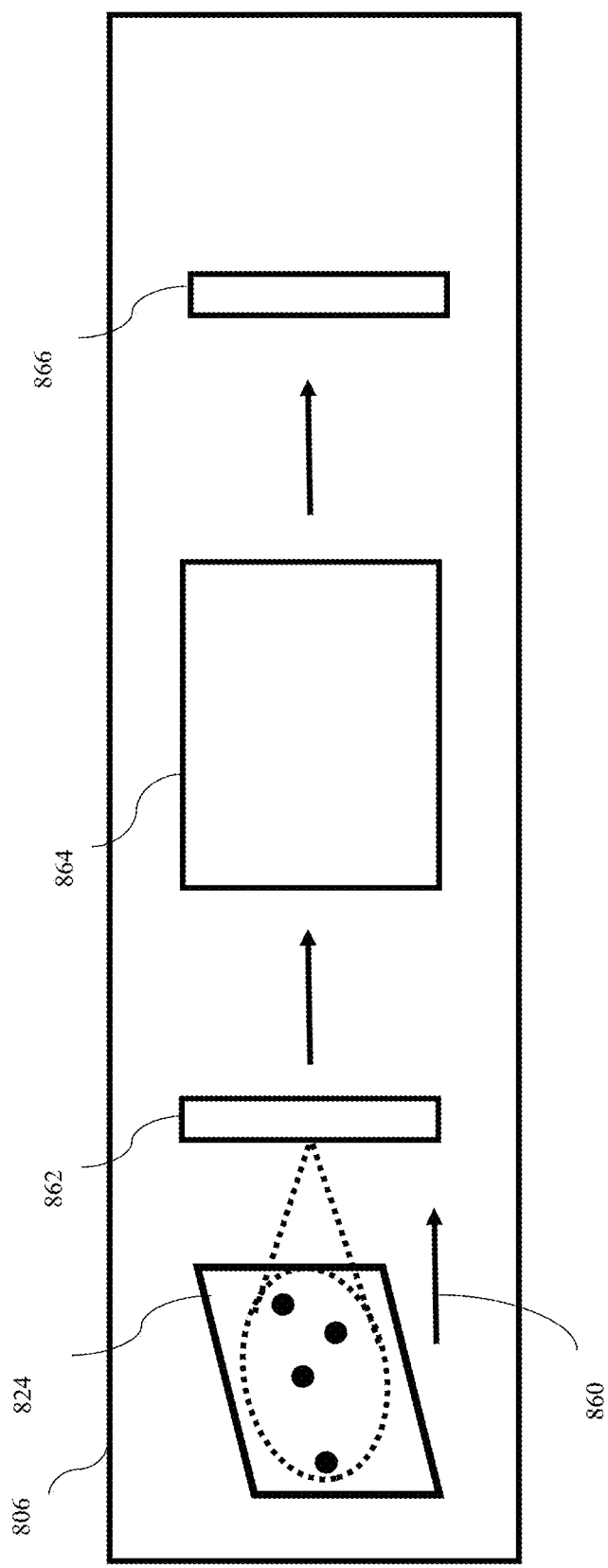

FIG. 8(a) and FIG. 8(b) illustrate an example of HNN in some embodiments. The HNN can include a hierarchal point set feature learner 802, the output of which can be used to perform segmentation 804 and/or classification 806. The hierarchal point set feature learner 802 example uses points in 2D Euclidean space as an example, but can operate on input 3D images in three dimensions. As illustrated in the example of FIG. 8(a), the HNN can receive an input image 808 with (N, d+C) and perform a first sampling and grouping operation 810 to generate a first sampled and grouped image 812 with ($N_1$, K, d+C), for example. The HNN can then provide the first sampled and grouped image 812 to PointNet at 814 to provide first abstracted image 816 with ($N_1$, d+$C_1$). The first abstracted image 816 can undergo sampling and grouping 818 to provide a second sampled and grouped image 820 with ($N_2$, K, d+$C_1$). The second sample and grouped image 820 can be provided to a PointNet neural network 822 to output a second abstracted image 824 with ($N_2$, d+C2).

In some embodiments, the second abstracted image 824 can be segmented by HNN segmentation 804. In some embodiments, the HNN segmentation 804 can take the second abstracted image 824 and perform a first interpolation 830, the output of which can be concatenated with the first abstracted image 816 to provide a first interpolated image 832 with ($N_1$, d+$C_2$+$C_1$). The first interpolated image 832 can be provided to a unit PointNet at 834 to provide first segment image 836 with ($N_1$, d+$C_3$). The first segment image 836 can be interpolated at 838, the output of which can be concatenated with the input image 808 to provide a second interpolated image 840 with ($N_1$, d+$C_3$+C). The second interpolated image 840 can be provided to a unit PointNet 842 to provide a segmented image 844 with (N, k). The segmented image 844 can provide per-point scores, for example.

As illustrated in the example of FIG. 8(b), the second abstracted image 824 can be classified by HNN classification 806 in some embodiments. In some embodiments, HNN classification can take second abstracted image 824 and provide it to a PointNet network 860, the output 862 of which can be provided to one or more fully connected layers such as connected layers 864, the output of which can provide class scores 866.

Some embodiments of the computer-implemented method can include determining, using a second neural network, a margin line proposal from a base margin line and the inner representation of the 3D digital model.

In some embodiments, the base margin line can be precomputed once per network type. In some embodiments, the network types can include molar and premolar. Other suitable network types can be used in some embodiments for example. In some embodiments, the same base margin line can be used as an initial margin line for each scan. In some embodiments, the network types can include other types. In some embodiments, the base margin line is 3 dimensional. In some embodiments, the base margin line can be determined based on margin lines from a training dataset used to train the first and the second neural networks. In some embodiments, the base margin line can be a precomputed mean or average of the training dataset margin lines. In some embodiments any type of mean or average can be used.

In some embodiments, the margin line proposal can be a free-form margin line proposal. In some embodiments, the second trained neural network can include a decoder neural network. In some embodiments, the decoder neural network can concatenate the inner representation with specific point coordinates to implement guided decoding. In some embodiments, the guided decoding can generate a closed surface as described in "A Papier-Mache Approach to Learning 3D Surface Generation," by T. Groueix, M. Fisher, V. G. Kim, B. C. Russell and M. Aubry, 2018 IEEE/CVF Conference on Computer Vision and Pattern Recognition, 2018, pp. 216-224, the entirety of which is hereby incorporated by reference.

Figure 9:
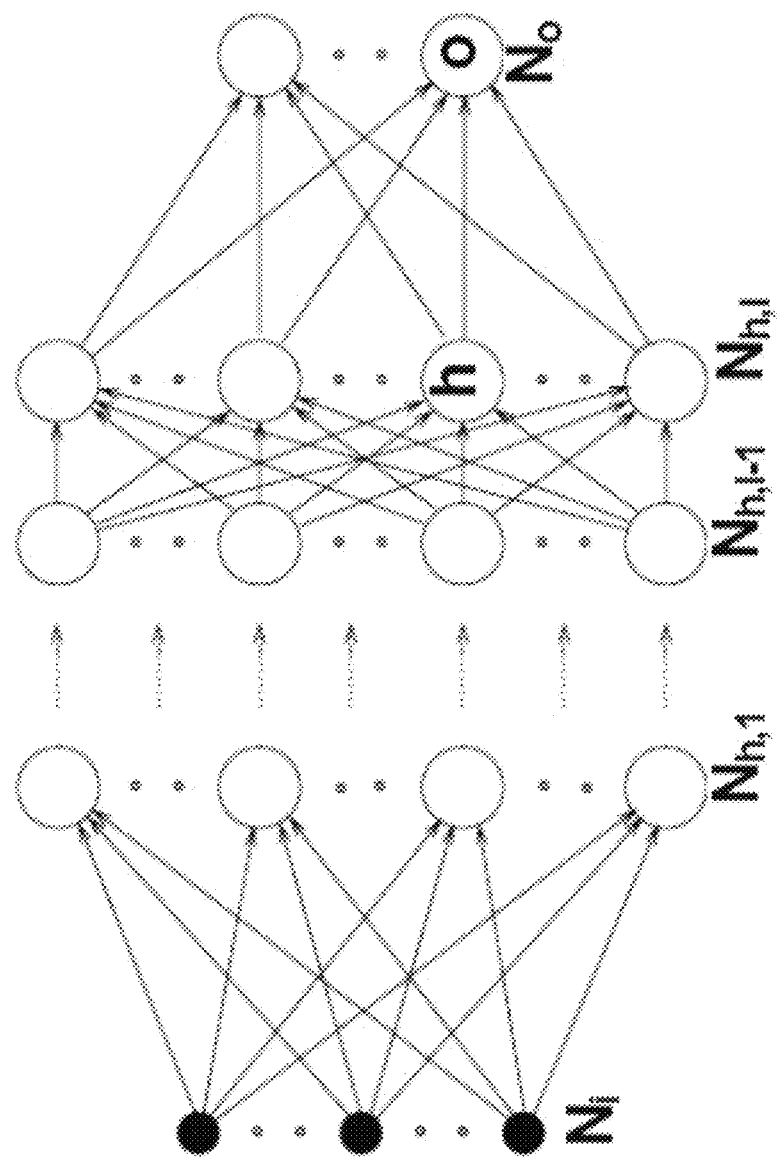
FIG. 9 shows a diagram of deep neural network in some embodiments for example.

In some embodiments, the decoder neural network can include a deep neural network ("DNN"). Referring now to FIG. 9, which is a high-level block diagram showing structure of a deep neural network (DNN) 400 according to some embodiments of the disclosure. DNN 400 includes multiple layers $N_i$, $N_{h,1}$, $N_{h,l-1}$, $N_{h,1}$, $N_o$, etc. The first layer $N_i$ is an input layer where one or more dentition scan data sets can be ingested. The last layer $N_o$ is an output layer. The deep neural networks used in the present disclosure may output probabilities and/or full 3D margin line proposal. For example, the output can be a probability vector that includes one or more probability values of each feature or aspect of the dental models belonging to certain categories. Additionally, the output can be a margin line proposal.

Each layer N can include a plurality of nodes that connect to each node in the next layer N+1. For example, each computational node in the layer $N_{h, l-1}$ connects to each computational node in the layer $N_{h,1}$. The layers $N_{h,1}$, $N_{h,1-1}$, $N_{h,1}$, between the input layer $N_i$ and the output layer $N_o$ are hidden layers. The nodes in the hidden layers, denoted as "h" in FIG. 9, can be hidden variables. In some embodiments, DNN 400 can include multiple hidden layers, e.g., 24, 30, 50, etc.

In some embodiments, DNN 400 may be a deep feedforward network. DNN 400 can also be a convolutional neural network, which is a network that uses convolution in place of the general matrix multiplication in at least one of the hidden layers of the deep neural network. DNN 400 may also be a generative neural network or a generative adversarial network. In some embodiments, training module 120 may use training data set with labels to supervise the learning process of the deep neural network. The labels are used to map a feature to a probability value of a probability vector. Alternatively, training module 120 may use unstructured and unlabeled training data sets to train, in an unsupervised manner, generative deep neural networks that do not necessarily require labeled training data sets.

In some embodiments, the DNN can be a multi-layer perceptron ("MLP"). In some embodiments, the MLP can include 4 layers. In some embodiments, the MLP can include a fully connected MLP. In some embodiments, the MLP utilizes BatchNorm normalization.

Figure 10:
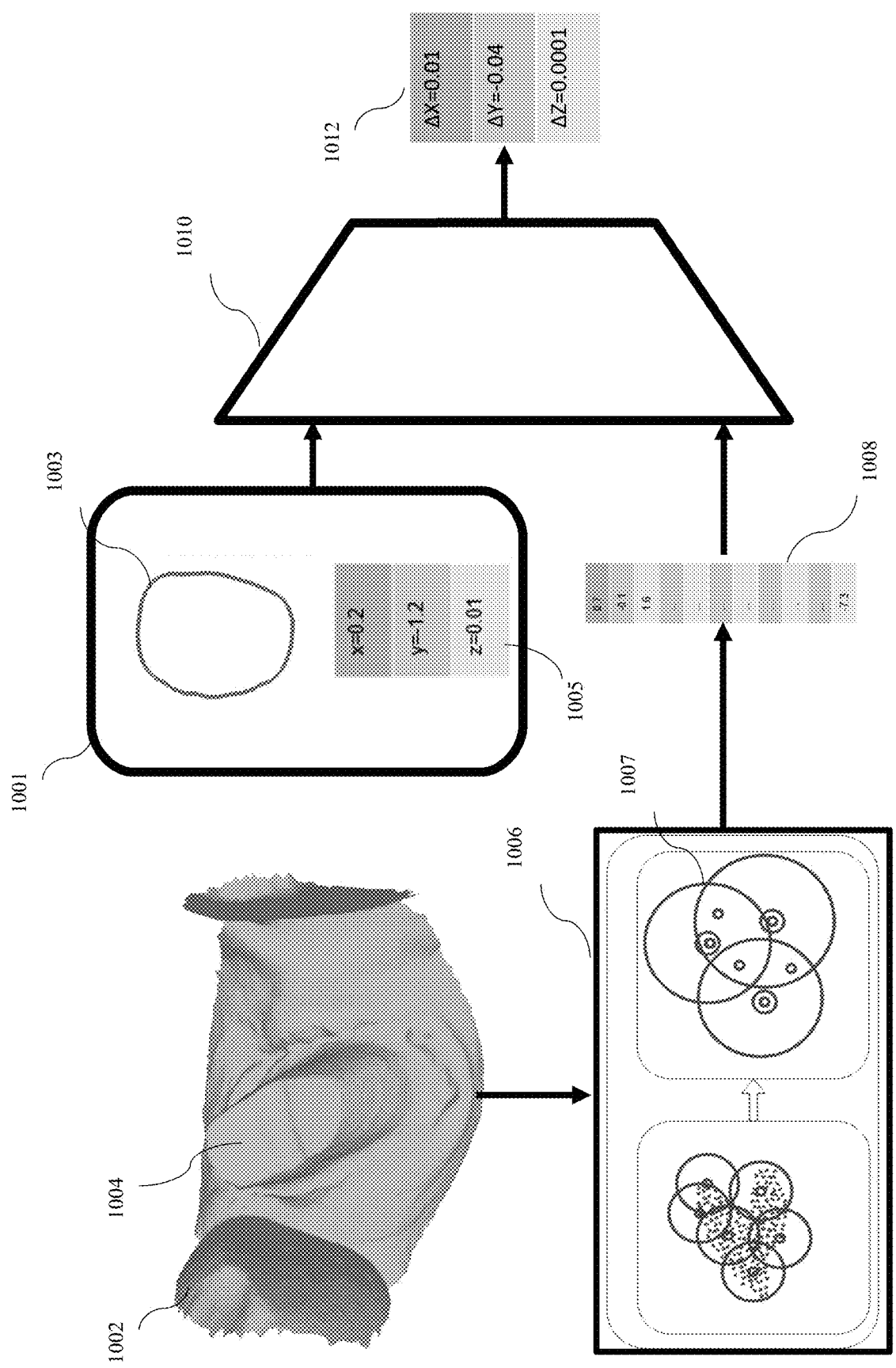
FIG. 10 shows a diagram of a computer-implemented method of automatic margin line proposal in some embodiments for example.

FIG. 10 shows a diagram of a computer-implemented method of automatic margin line proposal in some embodiments as an example. In some embodiments, prior to commencing margin line proposal for any 3D digital model, the computer-implemented method can precompute 1001 a base margin line 1003 in three dimensions, with each point of the base margin line 1003 having 3D coordinates such as coordinates 1005, for example. The computer-implemented method can receive a 3D digital model 1002 of at least a portion of a jaw. The 3D digital model can, in some embodiments, be in the form of a 3D point cloud. The 3D digital model can include a preparation tooth 1004, for example. The computer-implemented method can use a first trained neural network 1006 to determine an inner representation 1008 of the 3D digital model. In some embodiments, the first trained neural network 1006 can be a neural network that performs grouping and sampling 1007 and other operations on a 3D digital model, such as an HNN, in some embodiments, for example. In some embodiments, the computer-implemented method can, using a second trained neural network 1010, determine a margin line proposal from the base margin line 1003 and the inner representation 1008 of the 3D digital model. In some embodiments, the second trained neural network can provide, for example, one or more three dimensional displacement values 1012 for digital surface points of the base margin line 1003.

Figure 11:
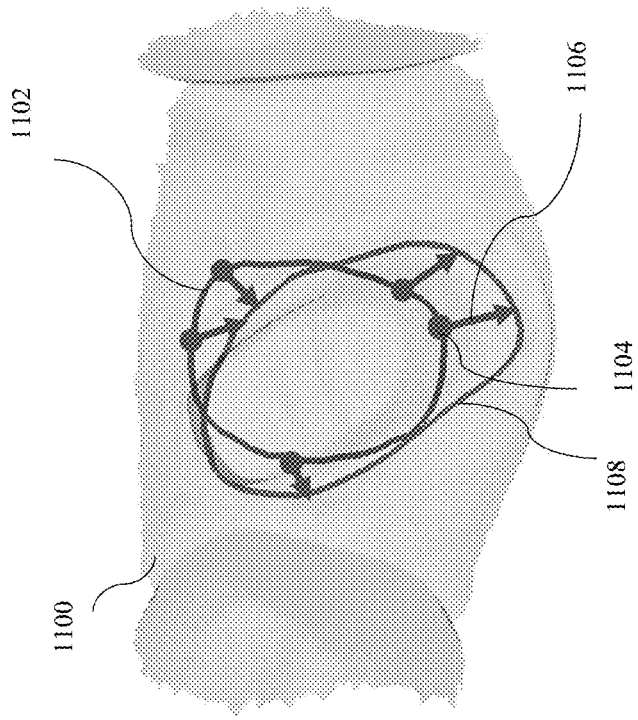
FIG. 11 shows a perspective view of an example of a 3D digital model showing a proposed margin line from a base margin line in some embodiments, for example.

In some embodiments, the second trained neural network can determine a margin line displacement value in three dimensions from the base margin line. In some embodiments, the second trained neural network uses a Bilateral-ChamferDistance as a loss function. In some embodiments, the computer-implemented method can move one or points of the base margin line by a displacement value to provide the margin line proposal. FIG. 11 shows an illustration of an example in some embodiments of adjusting the base margin line 1102 of a 3D digital model 1100. In the example, one or more base margin line points such as base margin line point 1104 can be displaced by a displacement value and direction 1106. Other base margin line points can be similarly adjusted by their corresponding displacement values and directions to form the margin line proposal 1108, for example.

Figure 12A:
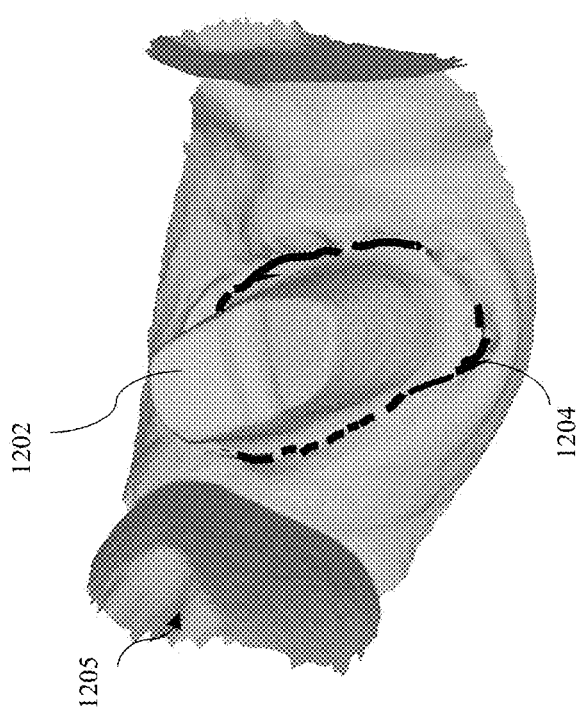
FIGS. 12(a) and 12(b) show a perspective view of a 3D digital model with a preparation tooth and a proposed margin line in some embodiments for example.
Figure 12B:
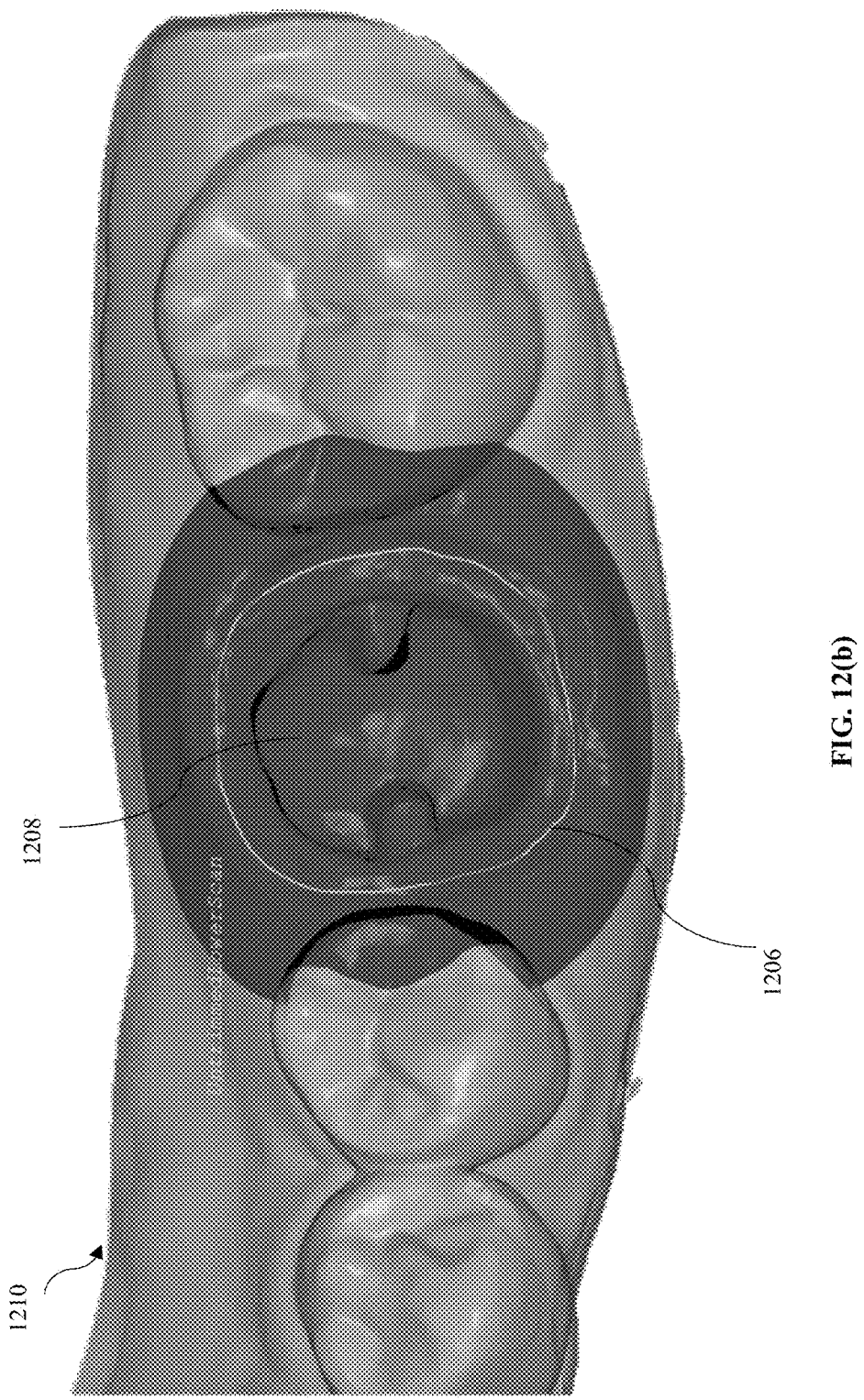

FIG. 12(a) illustrates one example of a proposed digital margin line 1204 for a digital preparation tooth 1202 of 3D digital model 1205. As can be seen in the figure, the margin line proposal can be made even in cases where the margin line is partially or completely covered by gum, blood, saliva, or other elements. FIG. 12(b) illustrates another example of a proposed digital margin line 1206 for digital preparation tooth 1208 of 3D digital model 1210. In some embodiments, the proposed margin line is displayed on the 3D digital model and can be manipulated by a user such as a dental technician or doctor using an input device to make adjustments to the margin line proposal.

In some embodiments, the first neural network and the second neural network can be trained using the same training dataset. In some embodiments, the training dataset can include one or more training samples. In some embodiments, the training dataset can include 70,000 training samples. In some embodiments, the one or more training samples each can include an occlusal direction, preparation die center, and buccal direction as a normalized positioning and orientation for each sample. In some embodiments, the occlusal direction, preparation die center, and buccal direction can be set manually. In some embodiments, the training dataset can include an untrimmed digital surface of the jaw and a target margin line on a surface of the corresponding trimmed digital surface. In some embodiments, the target margin line can be prepared by a technician. In some embodiments, training can use regression. In some embodiments, training can include using a loss-function to compare the margin line proposal with the target margin line. In some embodiments, the loss function can be a Chamfer-loss function. In some embodiments, the Chamfer-loss function can include:

$$d_{CD}(S_1, S_2) = \sum_{x \in S_1} \min_{y \in S_2} \|x-y\|_2^2 + \sum_{x \in S_2} \min_{y \in S_1} \|x-y\|_2^2$$

In some embodiments, training can be performed on a computing system can include at least one graphics processing unit ("GPU"). In some embodiments, the GPU can include two 2080-Ti Nvidia GPUs, for example. Other suitable GPU types, numbers, and equivalents can be used.

In some embodiments, the computer-implemented method can be performed automatically. Some embodiments can further include displaying the free-form margin line on the 3D digital model. In some embodiments, the free-form margin line can be adjusted by a user using an input device.

Figure 13:
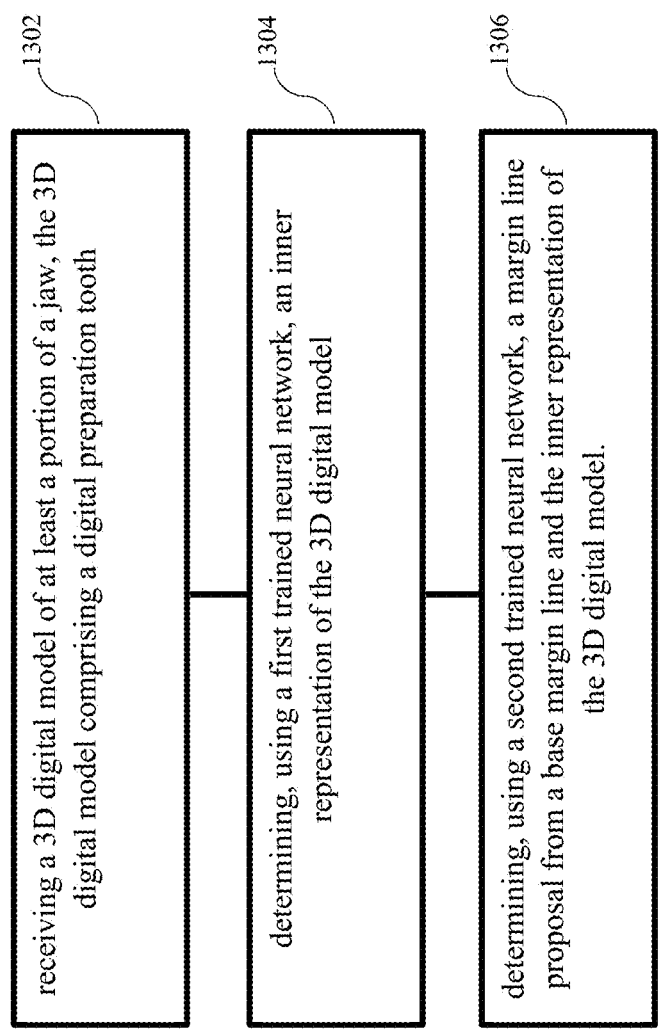
FIG. 13 is a flow diagram of a computer-implemented method of automatic margin line proposal in some embodiments for example.

FIG. 13 illustrates an example of a computer-implemented method of automatic margin line proposal. The method can include receiving a 3D digital model of at least a portion of a jaw, the 3D digital model including a digital preparation tooth at 1302, determining, using a first trained neural network, an inner representation of the 3D digital model at 1304, and determining, using a second trained neural network, a margin line proposal from a base margin line and the inner representation of the 3D digital model at 1306.

Some embodiments include a processing system of automatic margin line proposal: a processor, a computer-readable storage medium including instructions executable by the processor to perform steps including: receiving a 3D digital model of at least a portion of a jaw, the 3D digital model comprising a digital preparation tooth; determining, using a first trained neural network, an inner representation of the 3D digital model; and determining, using a second trained neural network, a margin line proposal from a base margin line and the inner representation of the 3D digital model.

In some embodiments, the computer-implemented method, system, and/or non-transitory computer readable medium can include one or more other features. For example, in some embodiments, the base margin line can include one or more digital points defining the margin of the digital preparation tooth. In some embodiments, the 3D digital model can include a 3D point cloud. In some embodiments, the first trained neural network can include a trained hierarchal neural network ("HNN"). In some embodiments, the first trained neural network can include a neural network for 3D point cloud analysis. In some embodiments, the second trained neural network can include a decoder neural network. In some embodiments, the first trained neural network and the second trained neural network are trained using a training dataset comprising an untrimmed digital surface of the jaw and a target margin line on a surface of the corresponding trimmed digital surface.

One or more advantages of one or more features in some embodiments can include, for example, providing a precise margin line for a preparation tooth, even in subgingival cases where the margin line is missing or covered. One or more advantages of one or more features in some embodiments can include, for example, more precise margin lines since a technician or any other user does not have to manually draw and/or guess the margin line. One or more advantages of one or more features in some embodiments can include, for example, faster margin line determination since a technician or other user does not have to manually draw the margin line for each 3D digital model. One or more advantages of one or more features in some embodiments can include, for example, greater efficiency due to automation of margin line determination. One or more advantages of one or more features in some embodiments can include, for example, determining the margin line proposal from a 3D digital model such as a point cloud, for example, thereby providing a more precise margin line proposal. One or more advantages of one or more features in some embodiments can include, for example, presence/automatic determination of occlusion direction, 3D center of preparation die, and/or buccal direction of a die, thereby providing input normalization and more accurate determine of margin line proposal. One or more advantages of one or more features in some embodiments can include, for example, not having to draw the margin line point by point. One or more advantages of one or more features in some embodiments can include, for example, providing a margin line proposal in subgingival cases, even when the margin line is missing or covered (partially or completely covered by gum and/or blood & saliva) and not requiring a technician to make up the margin line. One or more advantages of one or more features in some embodiments can include, for example, precise margin detection in fully automatic mode despite the variety of shapes, subgingival cases, and the requirement of making the margin line precise. One or more advantages of one or more features in some embodiments can include, for example, avoiding manual margin localization/construction, therefore saving time and effort.

Figure 14:
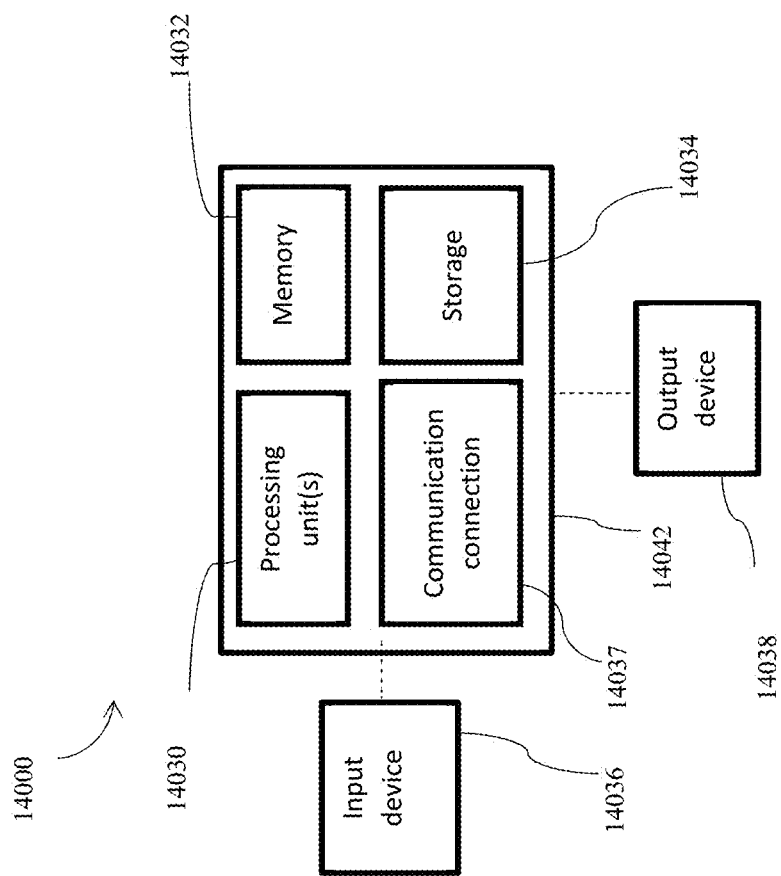
FIG. 14 is a diagram of a system in some embodiments for example.

FIG. 14 illustrates a processing system 14000 in some embodiments. The system 14000 can include a processor 14030, computer-readable storage medium 14034 having instructions executable by the processor to perform one or more steps described in the present disclosure.

In some embodiments the computer-implemented method can display a digital model on a display and receive input from an input device such as a mouse or touch screen on the display for example.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of automatic margin line proposal, comprising:
   receiving a 3D digital model of at least a portion of a jaw, the 3D digital model comprising a digital preparation tooth;
   determining, using a first trained neural network, an inner representation of the 3D digital model; and
   determining, using a second trained neural network, a margin line proposal from a base margin line and the inner representation of the 3D digital model,
   wherein the first trained neural network and the second trained neural network are trained using a training dataset comprising an untrimmed digital surface of the jaw and a target margin line on a surface of the corresponding trimmed digital surface.

2. The method of claim 1, wherein the base margin line comprises one or more digital points defining the margin of the digital preparation tooth.

3. The method of claim 1, wherein the 3D digital model comprises a 3D point cloud.

4. The method of claim 1, wherein the first trained neural network comprises a trained hierarchal neural network ("HNN").

5. The method of claim 1, wherein the first trained neural network comprises a neural network for 3D point cloud analysis.

6. The method of claim 1, wherein the second trained neural network comprises a decoder neural network.

7. A system for automatic margin line proposal, comprising:
   a processor; and
   a computer-readable storage medium comprising instructions executable by the processor to perform steps comprising:
   receiving a 3D digital model of at least a portion of a jaw, the 3D digital model comprising a digital preparation tooth;
   determining, using a first trained neural network, an inner representation of the 3D digital model; and
   determining, using a second trained neural network, a margin line proposal from a base margin line and the inner representation of the 3D digital model,
   wherein the first trained neural network and the second trained neural network are trained using a training dataset comprising an untrimmed digital surface of the jaw and a target margin line on a surface of the corresponding trimmed digital surface.

8. The system of claim 7, wherein the second trained neural network comprises a decoder neural network.

9. The system of claim 7, wherein the base margin line comprises one or more digital points defining the margin of the digital preparation tooth.

10. The system of claim 7, wherein the 3D digital model is a 3D point cloud.

11. The system of claim 7, wherein the first trained neural network comprises a trained hierarchal neural network ("HNN").

12. The system of claim 7, wherein the first trained neural network comprises a neural network for 3D point cloud analysis.

13. A non-transitory computer readable medium storing executable computer program instructions to automatically propose a margin line, the computer program instructions comprising:
receiving a 3D digital model of at least a portion of a jaw, the 3D digital model comprising a digital preparation tooth;
determining, using a first trained neural network, an inner representation of the 3D digital model; and
determining, using a second trained neural network, a margin line proposal from a base margin line and the inner representation of the 3D digital model,
wherein the first trained neural network and the second trained neural network are trained using a training dataset comprising an untrimmed digital surface of the jaw and a target margin line on a surface of the corresponding trimmed digital surface.

14. The medium of claim 13, wherein the first trained neural network comprises a trained hierarchal neural network ("HNN").

15. The medium of claim 13, wherein the second trained neural network comprises a decoder neural network.

16. The medium of claim 13, wherein the base margin line comprises one or more digital points defining the margin of the digital preparation tooth.

17. The medium of claim 13, wherein the 3D digital model is a 3D point cloud.

* * * * *